(12) United States Patent
Suzuki et al.

(10) Patent No.: US 8,705,611 B2
(45) Date of Patent: *Apr. 22, 2014

(54) IMAGE PREDICTION ENCODING DEVICE, IMAGE PREDICTION ENCODING METHOD, IMAGE PREDICTION ENCODING PROGRAM, IMAGE PREDICTION DECODING DEVICE, IMAGE PREDICTION DECODING METHOD, AND IMAGE PREDICTION DECODING PROGRAM

(75) Inventors: Yoshinori Suzuki, Saitama (JP); Choong Seng Boon, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 569 days.

This patent is subject to a terminal disclaimer.

(21) Appl. No.: 12/989,046

(22) PCT Filed: Apr. 17, 2009

(86) PCT No.: PCT/JP2009/057788
§ 371 (c)(1),
(2), (4) Date: Dec. 16, 2010

(87) PCT Pub. No.: WO2009/131075
PCT Pub. Date: Oct. 29, 2009

(65) Prior Publication Data
US 2011/0261886 A1  Oct. 27, 2011

(30) Foreign Application Priority Data
Apr. 24, 2008 (JP) ............................... P2008-114166

(51) Int. Cl.
*H04N 11/02* (2006.01)
*H04N 11/04* (2006.01)
(52) U.S. Cl.
USPC .................................... 375/240; 375/E7.119

(58) Field of Classification Search
None
See application file for complete search history.

(56) References Cited

U.S. PATENT DOCUMENTS 6,259,739 B1  7/2001  Kondo
6,765,964 B1  7/2004  Conklin
(Continued)

FOREIGN PATENT DOCUMENTS

JP    02-062180 A    3/1990
JP    2007-043651 A  2/2007
(Continued)

OTHER PUBLICATIONS

International Search Report for International Application No. PCT/JP2009/057788, dated Jul. 28, 2009, 2 pages.

(Continued)

*Primary Examiner* — Jay Patel
*Assistant Examiner* — Reza Aghevli
(74) *Attorney, Agent, or Firm* — Brinks Gilson & Lione

(57) ABSTRACT

An image prediction encoding device includes a prediction signal generator that produces a prediction signal with respect to a target pixel signal of a target region that is among regions divided by a block division unit, a motion estimator that searches for a motion vector required for the production of the prediction signal from an already reproduced signal, and a subtractor that produces a residual signal indicating a difference between the prediction signal and the target pixel signal. The prediction signal generator determines a search region that is a partial region of the already reproduced signal based on the motion vector and produces one or more type 2 candidate prediction signals. The prediction signal generator includes a candidate prediction signal combining unit that produces the prediction signal by processing the type 2 candidate prediction signals and a type 1 candidate prediction signal produced based on the motion vector.

22 Claims, 22 Drawing Sheets

(56) References Cited

U.S. PATENT DOCUMENTS

| | | | |
|---|---|---|---|
| 7,003,035 B2 | 2/2006 | Tourapis et al. | |
| 8,326,062 B2 * | 12/2012 | Chang et al. | 382/237 |
| 8,326,063 B2 * | 12/2012 | Boon et al. | 382/238 |
| 2007/0047648 A1 | 3/2007 | Tourapis et al. | |
| 2007/0086518 A1 * | 4/2007 | Jeon et al. | 375/240.1 |
| 2007/0110161 A1 * | 5/2007 | Saigo et al. | 375/240.16 |
| 2009/0116759 A1 | 5/2009 | Suzuki et al. | |
| 2009/0116760 A1 | 5/2009 | Boon et al. | |
| 2009/0161763 A1 * | 6/2009 | Rossignol et al. | 375/240.16 |
| 2009/0168884 A1 * | 7/2009 | Lu et al. | 375/240.16 |
| 2009/0168890 A1 * | 7/2009 | Holcomb | 375/240.16 |
| 2009/0296810 A1 * | 12/2009 | Kong et al. | 375/240.12 |
| 2013/0003854 A1 * | 1/2013 | Boon et al. | 375/240.16 |

FOREIGN PATENT DOCUMENTS

| | | |
|---|---|---|
| JP | 2007-503777 A | 2/2007 |
| JP | 2007-129498 A | 5/2007 |
| JP | 2007-300380 A | 11/2007 |
| JP | 2008-092352 A | 4/2008 |

OTHER PUBLICATIONS

Office Action from counterpart Mexican Application No. MX/a/2010/011609, dated Sep. 30, 2011, 6 pages.

Office Action from counterpart Australian Application No. 2009239127, dated Sep. 3, 2012, 4 pages.

Office Action from counterpart Canadian Application No. 2,722,027, dated Jan. 17, 2013, 3 pages.

Taiwan Office Action with English machine translation, dated May 21, 2013, pp. 1-9, Taiwan Patent Application Serial No. 10220625140, Taiwan Patent Office, Taichung City, Taiwan.

Taiwan Office Action with English machine translation, dated Jun. 25, 2013, pp. 1-23, Taiwan Patent Application Serial No. 10220801130, Taiwan Patent Office, Taichung City, Taiwan.

\* cited by examiner

IMAGE PREDICTION ENCODING DEVICE, IMAGE PREDICTION ENCODING METHOD, IMAGE PREDICTION ENCODING PROGRAM, IMAGE PREDICTION DECODING DEVICE, IMAGE PREDICTION DECODING METHOD, AND IMAGE PREDICTION DECODING PROGRAM

TECHNICAL FIELD

The present invention relates to an image prediction encoding device, an image prediction encoding method, an image prediction encoding program, an image prediction decoding device, an image prediction decoding method, and an image prediction decoding program, and particularly relates to an image prediction encoding device, an image prediction encoding method, an image prediction encoding program, an image prediction decoding device, an image prediction decoding method, and an image prediction decoding program that perform prediction encoding and decoding by using a motion search method and a signal combining method.

BACKGROUND ART

Compression encoding technology is used in order to efficiently transmit and store still image data and moving image data. The MPEG-1 to 4 and ITU (International Telecommunication Union) H.261 to H.264 systems are widely used for moving images.

In such encoding systems, encoding processing and decoding processing are carried out after dividing an image to be encoded into a plurality of blocks. In prediction encoding within a picture, a prediction signal is produced by using an adjacent already reproduced image signal (obtained by restoring compressed image data) within the same picture where a target block is included, and thereafter a differential signal obtained by subtracting the prediction signal from a signal of the target block is encoded. In prediction encoding between pictures, referring to an adjacent already reproduced image signal within a different picture from the picture within which the target block is included, motion compensation is carried out, and a prediction signal is produced. The prediction signal is subtracted from the signal of the target block so as to be a differential signal and the differential signal is encoded.

For example, intra-picture prediction encoding of H.264 adopts a method in which a prediction signal is produced by extrapolating, in a predetermined direction, already reproduced pixel values adjacent to a block to be encoded. FIG. 22 is a schematic view to describe an intra-picture prediction method used in ITU H.264. In FIG. 22(A), a target block 1802 is an encoding target block. A pixel group 1801 is an adjacent region composed of pixels A to M located adjacent to the boundary of the target block 1802. The pixel group 1801 is an image signal that has been already reproduced in a past process.

In this case, the pixel group 1801 that is composed of adjacent pixels directly above the target block 1802 is extrapolated downwards to produce a prediction signal. In FIG. 22(B), the already reproduced pixels (I to L) located on the left of a target block 1804 are extrapolated rightward to produce a prediction signal. The specific method of producing a prediction signal is described in Patent Document 1, for example. The difference with the pixel signal of the target block is found for each of the nine prediction signals produced by the method shown in FIG. 22(A) to FIG. 22(I) as described above. The prediction signal having the lowest difference is taken to be the optimal prediction signal. In this way, a prediction signal can be produced by extrapolating pixels. The details are explained in Patent Document 1 listed below.

In typical inter-picture prediction encoding, a prediction signal is produced by a method that searches for a signal resembling the pixel signal of a block to be encoded from already reproduced pictures. A motion vector and a residual signal are encoded. The motion vector indicates the spatial displacement amount between the target block and a region constituted by the searched signal. The residual signal means the difference between the pixel signal of the target block and the prediction signal. The technique of searching for the motion vector for each block in this way is called block matching.

FIG. 5 is a schematic view to describe a block matching process. Here, the procedure for producing a prediction signal is described by taking as an example a target block 402 on a target picture 401. A picture 403 has been already reproduced. A region 404 is a region that is in the same spatial position as the target block 402. In block matching, a search range 405 surrounding the region 404 is set, and then a region 406 that has the lowest sum of absolute differences between the pixel signal of the target range and the pixel signal of the target block 402 is detected from the search range 405. The signal of the region 406 becomes a prediction signal. The displacement amount from the region 404 to the region 406 is detected as a motion vector 407. In H.264, in order to correspond to local feature changes in images, a plurality of prediction types with different block sizes for encoding the motion vector is prepared. The prediction types of H.264 are described in Patent Document 2, for example.

In compression encoding of moving image data, each picture (frame or field) can be encoded in any sequence. Therefore, there are three approaches on encoding sequence in the inter-picture prediction that produces a prediction signal using reproduced pictures. The first approach is a forward prediction that produces a prediction signal using reproduced pictures in the past in the order of reproduction sequence. The second approach is a backward prediction that refers to reproduced pictures in the future in the order of reproduction sequence. The third approach is a bidirectional prediction that carries out both the forward prediction and the backward prediction so as to average the two prediction signals. The types of inter-picture prediction are described in Patent Document 3, for example.

As described above, H.264 provides the prediction types with different block sizes for encoding the motion vector in order to cope with local feature changes in images. As the block size shrinks, the number of motion vectors to be encoded increases, which has led the development of a method of producing motion vectors of four blocks divided from an encoding target block by utilizing already reproduced pixel values adjacent to each block based on one motion vector. This method is described in Patent Document 4.

Additionally, there is a method of producing a prediction signal by utilizing already reproduced pixel values adjacent to an encoding target block without the motion vector. The method can remove noise components included in prediction signals by producing and averaging a plurality of candidate prediction signals, like in the bidirectional prediction. This method is described in Patent Document 5.

RELATED-ART DOCUMENT

Patent Documents

Patent Document 1: U.S. Pat. No. 6,765,964
Patent Document 2: U.S. Pat. No. 7,003,035

Patent Document 3: U.S. Pat. No. 6,259,739
Patent Document 4: JP-2-62180A
Patent Document 5: JP-2007-300380A

DISCLOSURE OF THE INVENTION

Problems to be Solved by the Invention

In a signal prediction method that produces prediction signal of each pixel by copying reproduction pixel values, the reproduction pixel values include distortion caused by encoding (for example, quantization noise), resulting in the prediction signals also including the distortion. The prediction signals including the distortion due to encoding become factors to lower encoding efficiency, such as an increase in the encoded volume of residual signals and deterioration of reproduction image quality.

The effects of the distortion due to encoding can be suppressed by smoothing the prediction signals. The bidirectional prediction that averages two prediction signals, thus, also has a suppression effect. The bidirectional prediction, however, needs to encode two motion vectors since two prediction signals are produced on a reproduction side.

On the other hand, as described in the related art, the prediction signals can be produced without encoding the motion vectors if the already reproduced pixel values adjacent to the encoding target block are utilized. However, in order to encode an input image having large motion with high prediction performance, a search range needs to be widened. As a result, it takes longer time to produce the prediction signals in decoding than in the methods that encode the motion vectors.

In order to solve the problems described above, the present invention aims to provide an image prediction encoding device, an image prediction encoding method, an image prediction encoding program, an image prediction decoding device, an image prediction decoding method, and an image prediction decoding program that can efficiently produce a prediction signal with small additional information and small computational amount.

Means for Solving the Problems

In order to solve the problems described above, an image prediction encoding device of the present invention includes: a region division means for dividing an input image into a plurality of regions; a motion estimation means for searching for, from an already reproduced signal, a signal having high correlation with a target pixel signal of a target region to be processed in the plurality of regions divided by the region division means, and detects motion information for indicating the searched signal; a prediction signal production means for producing a prediction signal with respect to the target pixel signal of the target region; a residual signal production means for producing a residual signal indicating a difference between the prediction signal produced by the prediction signal production means and the target pixel signal; and an encoding means for encoding the residual signal produced by the residual signal production means and the motion information detected by the motion estimation means. The prediction signal production means includes: a motion compensation means for producing a type 1 candidate prediction signal from the already reproduced signal based on the motion information; a search region determination means for determining a search region that is a partial region of the already reproduced signal based on the motion information; a template matching means for searching for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal based on the plurality of prediction adjacent regions; and a candidate prediction signal combining means for producing a prediction signal by using the type 1 candidate prediction signal produced by the motion compensation means and the one or more type 2 candidate prediction signals produced by the template matching means.

With this structure, the search region is determined based on the motion information, and the type 2 prediction signals can be produced from the search region. The search time can be thus reduced, enabling the prediction signal to be efficiently produced.

In the image prediction encoding device of the present invention, it is preferable that: the motion information detected by the motion estimation means include at least information indicating a first reproduction picture used for producing the type 1 candidate prediction signal and information of a motion vector indicating the type 1 candidate prediction signal; the search region determination means select a second reproduction picture including the search region based on the information of the first reproduction picture, and determine a spatial location of the search region in the second reproduction picture by using a picture distance in a temporal direction between a picture including the target region and the first reproduction picture, a picture distance in a temporal direction between the picture including the target region and the second reproduction picture, and the motion vector.

According to the invention, the search region for searching for the type 2 candidate prediction signals can be determined, enabling the search process of the type 2 candidate prediction signals to be promptly carried out.

In the image prediction encoding device of the present invention, it is preferable that the candidate prediction signal combining means produce weight coefficients for weighted-averaging based on difference values between the adjacent pixel signal of the target adjacent region and pixel signals of candidate prediction adjacent regions adjacent to the plurality of candidate prediction signals, and produce the prediction signal of the target region by weighted-averaging the plurality of candidate prediction signals with the weight coefficients.

According to the invention, the candidate prediction signal can be averaged, enabling a more appropriate prediction signal to be produced.

In the image prediction encoding device of the present invention, it is preferable that the template matching means carry out a selection so that at least any of components constituting the motion vector indicating the type 2 candidate prediction signals has a value other than zero when a value of each component constituting the motion vector is zero and the search region belongs to a different picture from the first reproduction picture. According to the invention, an averaging processing effect can be more effectively obtained.

In the image prediction encoding device of the present invention, it is preferable that the search region determination means determine the second reproduction picture as a picture located in a temporally opposite direction to the first reproduction picture relative to the picture including the target region.

In the image prediction encoding device of the present invention, it is preferable that the search region determination means determine the second reproduction picture as a picture that is different from the first reproduction picture and is temporally closest to the picture including the target region.

In the image prediction encoding device of the present invention, it is preferable that the search region determination means select a plurality of search regions by selecting a plurality of pictures for the second reproduction picture.

In the image prediction encoding device of the present invention, it is preferable that the search region determination means select the first reproduction picture for the second reproduction picture.

In the image prediction encoding device of the present invention, it is preferable that the search region determination means select a reproduced region of the input image for the second reproduction picture.

In the image prediction encoding device of the present invention, it is preferable that the search region determination means select different pixel signals from the type 1 candidate prediction signal for the type 2 candidate prediction signals.

According to these inventions, determining and selecting the second reproduction picture or the type 2 candidate prediction signals can more appropriately average the candidate prediction signals, enabling an appropriate prediction signal to be produced.

An image prediction decoding device of the present invention includes: a data decoding means for decoding, from compressed data, encoded data of motion information and encoded data of a residual signal relating to a target region to be processed; a residual signal restoring means for restoring a reproduction residual signal from the residual signal decoded by the data decoding means; a prediction signal production means for producing a prediction signal with respect to a target pixel signal of the target region; and an image restoring means for restoring a pixel signal of the target region by adding the prediction signal produced by the prediction signal production means to the reproduction residual signal restored by the residual signal restoring means. The prediction signal production means includes: a motion compensation means for producing a type 1 candidate prediction signal from an already reproduced signal based on the motion information decoded by the data decoding means; a search region determination means for determining a search region that is a partial region of the already reproduced signal based on the motion information; a template matching means for searching for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal based on the plurality of prediction adjacent regions; and a candidate prediction signal combining means for producing a prediction signal based on the type 1 candidate prediction signal produced by the motion compensation means and the one or more type 2 candidate prediction signals produced by the template matching means.

In the image prediction decoding device of the present invention, it is preferable that: the motion information detected by the motion estimation means include at least information indicating a first reproduction picture used for producing the type 1 candidate prediction signal and information of a motion vector indicating the type 1 candidate prediction signal; the search region determination means select a second reproduction picture including the search region based on the information of the first reproduction picture, and determine a spatial location of the search region in the second reproduction picture by using a picture distance in a temporal direction between a picture including the target region and the first reproduction picture, a picture distance in a temporal direction between the picture including the target region and the second reproduction picture, and the motion vector.

According to the invention, the search region for searching for the type 2 candidate prediction signals can be determined, enabling the search process of the type 2 candidate prediction signals to be promptly carried out.

In the image prediction decoding device of the present invention, the candidate prediction signal combining means produces weight coefficients for weighted-averaging based on difference values between the adjacent pixel signal of the target adjacent region and pixel signals of candidate prediction adjacent regions adjacent to the plurality of candidate prediction signals, and produce the prediction signal of the target region by weighted-averaging the plurality of candidate prediction signals based on the weight coefficients.

According to the invention, the candidate prediction signal can be averaged, enabling a more appropriate prediction signal to be produced.

In the image prediction decoding device of the present invention, it is preferable that the template matching means carry out a selection so that at least any of components constituting the motion vector indicating the type 2 candidate prediction signals has a value other than zero when a value of each component constituting the motion vector is zero and the search region belongs to a different picture from the first reproduction picture. According to the invention, an averaging processing effect can be more effectively obtained.

In the image prediction decoding device of the present invention, it is preferable that the search region determination means determine the second reproduction picture as a picture located in a temporally opposite direction to the first reproduction picture relative to the picture including the target region.

In the image prediction decoding device of the present invention, it is preferable that the search region determination means determine the second reproduction picture as a picture that is different from the first reproduction picture and is temporally closest to the picture including the target region.

In the image prediction decoding device of the present invention, it is preferable that the search region determination means select a plurality of search regions by selecting a plurality of pictures for the second reproduction picture.

In the image prediction decoding device of the present invention, it is preferable that the search region determination means select the first reproduction picture for the second reproduction picture.

In the image prediction decoding device of the present invention, it is preferable that the search region determination means select the picture including the target region for the second reproduction picture.

In the image prediction decoding device of the present invention, it is preferable that the search region determination means select different pixel signals from the type 1 candidate prediction signal for the type 2 candidate prediction signals.

In these inventions, determining and selecting the second reproduction picture or the type 2 candidate prediction signals can more appropriately average the candidate prediction signals, enabling an appropriate prediction signal to be produced.

Besides the image prediction encoding device and the image prediction decoding device of the present invention, the present invention can be embodied as an image prediction encoding method, an image prediction decoding method, an image prediction encoding program, and an image prediction decoding program as described below. These inventions are different categories and demonstrate the same operations and effects of the devices.

An image prediction encoding method of the present invention includes: a region division step that divides an input image into a plurality of regions; a motion estimation step that searches for, from an already reproduced signal, a signal having high correlation with a target pixel signal of a target region to be processed in the plurality of regions divided in the region division step, and detects motion information for indicating the searched signal; a prediction signal production step that produces a prediction signal with respect to the target pixel signal of the target region; a residual signal production step that produces a residual signal indicating a difference between the prediction signal produced in the prediction signal production step and the target pixel signal; and an encoding step that encodes the residual signal produced in the residual signal production step and the motion information detected in the motion estimation step. The prediction signal production step includes: a motion compensation step that produces a type 1 candidate prediction signal from the already reproduced signal based on the motion information; a search region determination step that determines a search region that is a partial region of the already reproduced signal based on the motion information; a template matching step that searches for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal based on the plurality of prediction adjacent regions; and a candidate prediction signal combining step that produces a prediction signal based on the type 1 candidate prediction signal produced in the motion compensation step and the one or more type 2 candidate prediction signals produced in the template matching step.

An image prediction decoding method of the present invention includes: a data decoding step that decodes, from compressed data, encoded data of motion information and encoded data of a residual signal relating to a target region to be processed; a residual signal restoring step that restores a reproduction residual signal from the residual signal decoded in the data decoding step; a prediction signal production step that produces a prediction signal with respect to a target pixel signal of the target region; and an image restoring step that restores a pixel signal of the target region by adding the prediction signal produced in the prediction signal production step to the reproduction residual signal restored in the residual signal restoring step. The prediction signal production step includes: a motion compensation step that produces a type 1 candidate prediction signal from an already reproduced signal based on the motion information decoded in the data decoding step; a search region determination step that determines a search region that is a partial region of the already reproduced signal based on the motion information; a template matching step that searches for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal based on the plurality of prediction adjacent regions; and a candidate prediction signal combining step that produces a prediction signal based on the type 1 candidate prediction signal produced in the motion compensation step and the one or more type 2 candidate prediction signals produced in the template matching step.

An image prediction encoding program of the present invention includes: a region division module that divides an input image into a plurality of regions; a motion estimation module that searches for, from an already reproduced signal, a signal having high correlation with a target pixel signal of a target region to be processed in the plurality of regions divided by the region division module, and detects motion information for indicating the searched signal; a prediction signal production module that produces a prediction signal with respect to the target pixel signal of the target region; a residual signal production module that produces a residual signal indicating a difference between the prediction signal produced by the prediction signal production module and the target pixel signal; and an encoding module that encodes the residual signal produced by the residual signal production module and the motion information detected by the motion estimation module. The prediction signal production module includes: a motion compensation module that produces a type 1 candidate prediction signal from the already reproduced signal based on the motion information; a search region determination module that determines a search region that is a partial region of the already reproduced signal based on the motion information; a template matching module that searches for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal based on the plurality of prediction adjacent regions; and a candidate prediction signal combining module that produces a prediction signal based on the type 1 candidate prediction signal produced by the motion compensation module and the one or more type 2 candidate prediction signals produced by the template matching module.

An image prediction decoding program of the present invention includes: a data decoding module that decodes, from compressed data, encoded data of motion information and encoded data of a residual signal relating to a target region to be processed; a residual signal restoring module that restores a reproduction residual signal from the residual signal decoded by the data decoding module; a prediction signal production module that produces a prediction signal with respect to a target pixel signal of the target region; and an image restoring module that restores a pixel signal of the target region by adding the prediction signal produced by the prediction signal production module to the reproduction residual signal restored by the residual signal restoring module. The prediction signal production module includes: a motion compensation module that produces a type 1 candidate prediction signal from an already reproduced signal based on the motion information decoded by the data decoding module; a search region determination module that determines a search region that is a partial region of the already reproduced signal based on the motion information; a template matching module that searches for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal based on the plurality of prediction adjacent regions; and a candidate prediction signal combining module that produces a prediction signal based on the type 1 candidate prediction signal produced by the motion compensation module and the one or more type 2 candidate prediction signals produced by the template matching module.

Effects of the Invention

The image prediction encoding device, the image prediction encoding method, the image prediction encoding program, the image prediction decoding device, the image prediction decoding method, and the image prediction decoding program of the present invention can produce a plurality of candidate prediction signals based on less motion information in shorter search time, thereby enabling a prediction signal having an averaging effect to be efficiently produced. In addition, when a prediction technique not utilizing motion information and the present technique are applicably utilized, there is an effect of being able to limit the search range of the former prediction technique.

BRIEF DESCRIPTION OF THE DRAWINGS

FIG. 5(a) shows a reference picture while FIG. 5(b) shows a target picture.

FIG. 7(a) shows a reference picture while FIG. 7(b) shows a target picture.

FIG. 8(a) shows a reference picture while FIG. 8(b) shows a target picture to be encoded.

Figure 1:
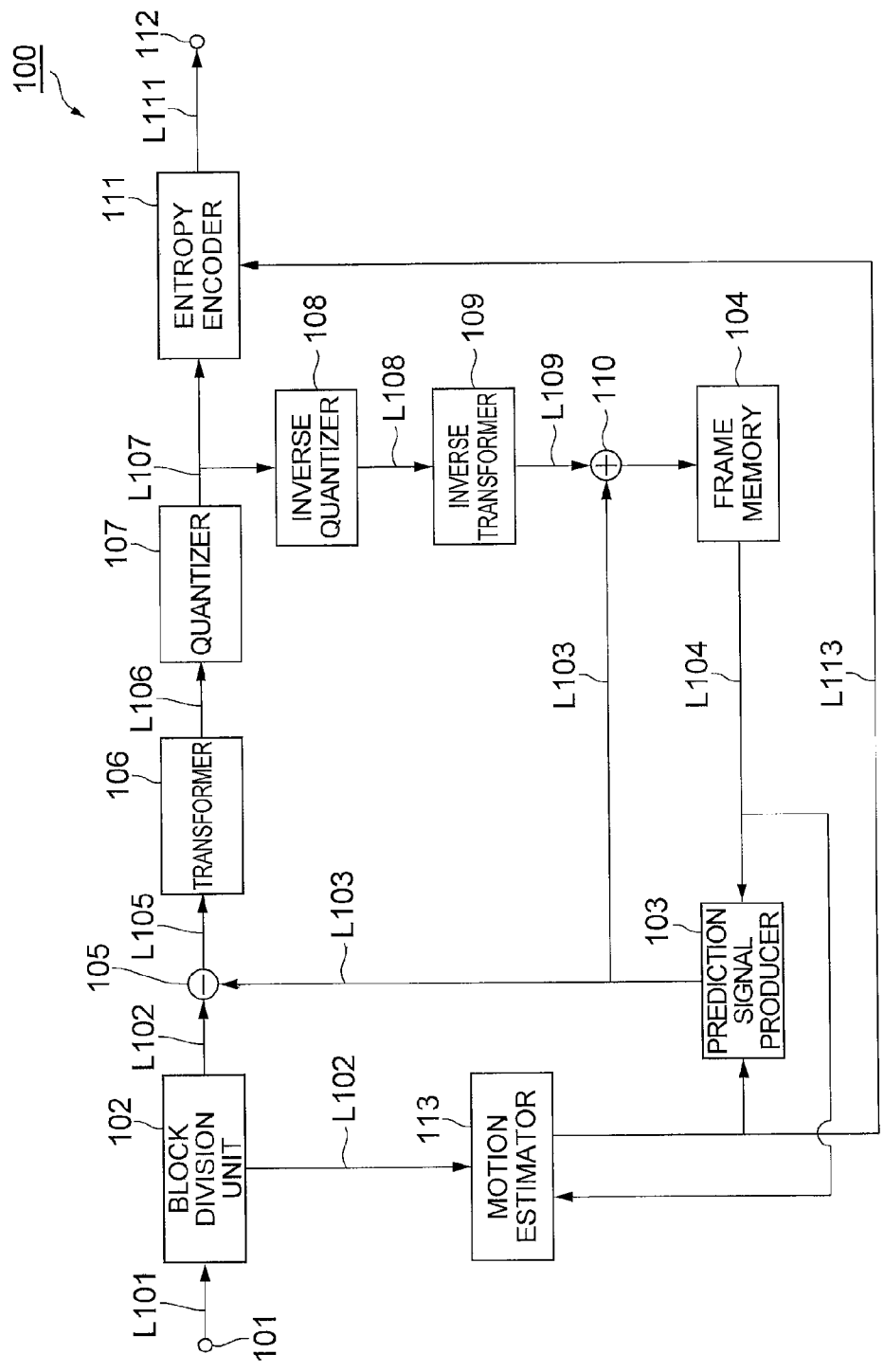
FIG. 1 is a block diagram showing an image prediction encoding device according to an embodiment.

DESCRIPTION OF THE REFERENCE NUMERALS 100 image prediction encoding device
101 input terminal
102 block division unit
103 prediction signal generator
104 frame memory
105 subtractor
106 transformer
107 quantizer
108 inverse quantizer
109 inverse transformer
110 adder
111 entropy encoder
112 output terminal
113 motion estimator
201 search region setter
202 template matcher
203 candidate prediction signal combining unit
204 motion compensator
205 candidate prediction region acquisition unit
206 weight coefficient calculator
211 target adjacent region acquisition unit
212 prediction adjacent region acquisition unit
213 candidate prediction region selector
214 candidate prediction region determiner
221 target adjacent region acquisition unit
223 candidate prediction adjacent region acquisition unit
224 weight coefficient determiner
225 weight coefficient multiplier
226 adder-divider
300 image prediction decoder
301 input terminal
302 entropy decoder
303 inverse quantizer
304 inverse transformer
305 adder
306 output terminal

BEST MODES FOR CARRYING OUT THE INVENTION

The embodiments are described below in detail with reference to the accompanying drawings. In the description of the drawings, elements that are the same or equivalent are labeled with the same reference numerals, and the duplicated description thereof is omitted.

<Image Prediction Encoding Method>

FIG. 1 is a block diagram showing an image prediction encoding device 100 according to an embodiment. The image prediction encoding device 100 includes an input terminal 101, a block division unit 102 (region division means), a prediction signal generator 103 (prediction signal production means), a frame memory 104, a subtractor 105 (residual signal production means), a transformer 106, a quantizer 107, an inverse quantizer 108, an inverse transformer 109 (encoding means), an adder 110 (encoding means), an entropy encoder 111 (encoding means), an output terminal 112, and a motion estimator 113 (motion estimation means). The transformer 106 and the quantizer 107 function as the encoding means.

The input terminal 101 is a terminal to which a signal of a moving image composed of a plurality of images is input.

The block division unit 102 divides an image that is represented by the signal input from the input terminal 101 and is the target of encoding into a plurality of regions. In the present embodiment, the image is divided into a block composed of 8×8 pixels. The block may be divided to have a different size or shape from this block.

The motion estimator 113 detects motion information necessary to produce a prediction signal of a target region (a target block) that is the target of an encoding process. The specific process of the motion estimator 113 is described later.

The prediction signal generator 103 produces a prediction signal of the target block by using the motion information input through a line L113, outputs the prediction signal to the subtractor 105, and outputs information on a prediction method to the entropy encoder 111. The specific process of the prediction signal generator 103 is described later.

The frame memory 104 stores a reference image, which is produced by reproducing a signal of the target block as described later.

The subtractor 105 subtracts, from the target region that is obtained by division with the block division unit 102 and is input through a line L102, the prediction signal that is produced by the prediction signal generator 103 and is input through a line L103, to produce a residual signal. The subtractor 105 outputs the residual signal obtained by the subtraction to the transformer 106 through a line L105.

The transformer 106 performs a discrete cosine transform process on the residual signal obtained by the subtraction. The quantizer 107 quantizes a transform coefficient resulted from the discrete cosine transform process performed by the transformer 106. The entropy encoder 111 encodes the quantized transform coefficient quantized by the quantizer 107 as well as the information on the prediction method, and outputs the encoded information through a line L111. The output terminal 112 outputs the information input from the entropy encoder 111 to an outside.

The inverse quantizer 108 inverse-quantizes the quantized transform coefficient. The inverse transformer 109 restores the residual signal by performing an inverse discrete cosine transform process. The adder 110 adds the restored residual signal to the prediction signal sent from the line L103 so as to reproduce the signal of the target block, and stores the reproduced signal in the frame memory 104. In the present embodiment, the transformer 106 and the inverse transformer 109 are used. Another transform process may be used as alternatives of these transformers. In addition, the transformer 106 and the inverse transformer 109 are not indispensable. In this way, the compressed pixel signal of the target region is restored by inverse processing and stored in the frame memory 104 in order to carry out intra-picture prediction or inter-picture prediction with respect to a subsequent target region.

Next, the motion estimator 113 and the prediction signal generator 103 are described. The motion estimator 113 searches for, from an already reproduced signal stored in the frame memory 104, a candidate prediction region resembling the target region (hereinafter referred to as the target block) that is the target of an encoding process, and detects motion information which is needed to derive the candidate prediction region from the already reproduced signal. The prediction signal generator 103 produces the prediction signal of the target block by using the detected motion information and the already reproduced signal. In the present embodiment, two types of prediction methods are used. That is, the prediction signal generator 103 produces the prediction signal by using at least one of an inter-picture prediction method and an intra-picture prediction method. Selection information for selecting the inter-picture prediction method and the intra-picture prediction method is encoded by the entropy encoder 111 together with the quantized transform coefficient and the motion information, and is output from the output terminal 112.

First, a motion information production process in the motion estimator 113 is described. When the intra-picture prediction method is used, the motion estimator 113 detects a motion vector by a block matching process using an already reproduced image signal of the picture (a frame or a field) in which the target block is included as a reference picture (corresponding to a first reproduction picture). Here, the reference picture means a target reproduction picture in which the motion vector is searched. When the inter-picture prediction method is used, the motion vector is detected by the block matching process using a reproduction image signal of a picture (a frame or a field) different from the picture in which the target block is included as the reference picture (corresponding to the first reproduction picture). The detected motion vector is output to the prediction signal generator 103 through L113 and to the entropy encoder (through the line L113) from the motion estimator 113 as motion information.

Figure 5:
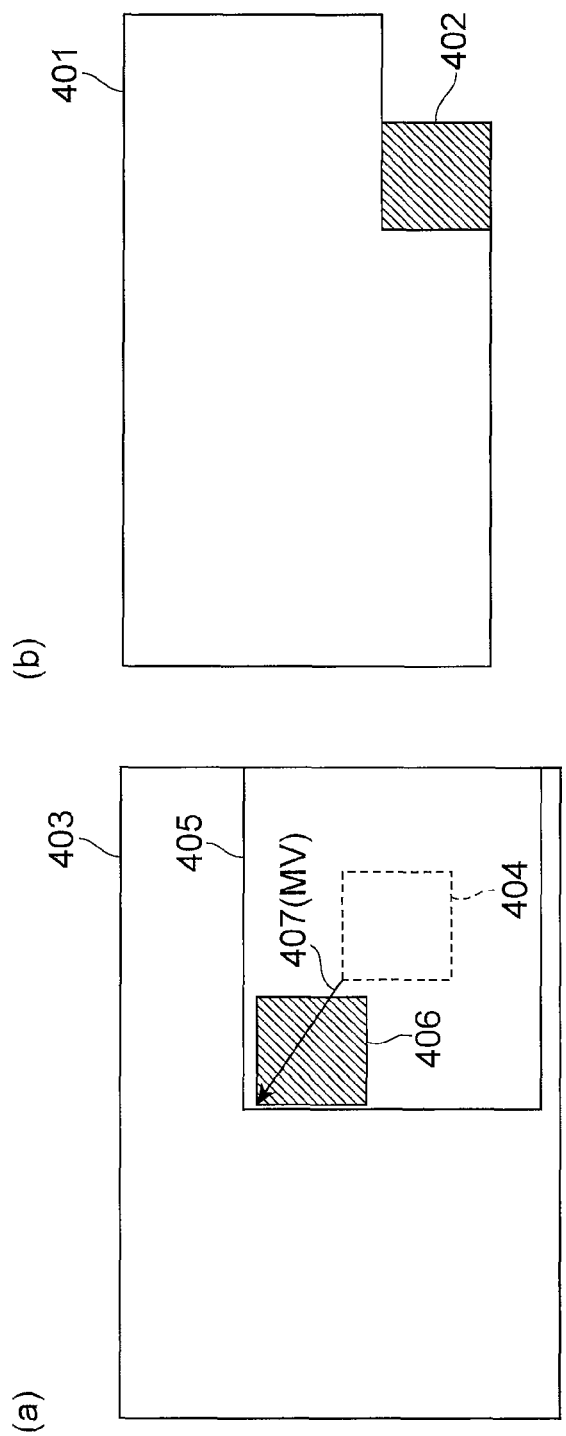
FIG. 5 is a schematic view to describe a motion estimation process (a block matching process).

With reference to FIG. 5, a motion vector search method in inter-picture prediction by the motion estimator 113 is described further in detail. In FIG. 5, the block matching process is described as this example. The motion estimator 113 needs to be able to search for the motion information in any way. The search method is not limited to the block matching process. FIG. 5 is a schematic view to describe a motion vector detection method. FIG. 5(a) shows the reference picture (corresponding to the first reproduction picture). FIG. 5(b) shows the target picture to be encoded. Here, a case is described in which a motion vector of the target block 402 in the target picture 401 to be encoded is detected.

Figure 20:
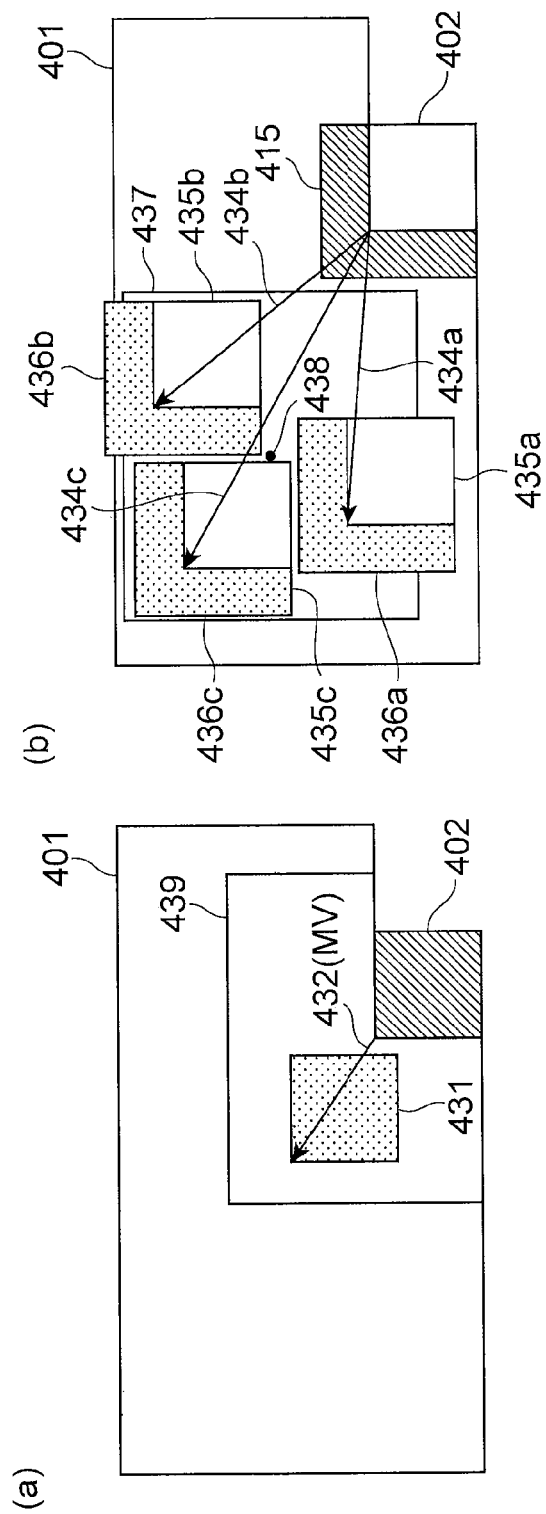
FIG. 20(a) is a schematic view of a motion estimation process in intra-picture prediction.
FIG. 20(b) is a schematic view of the template matching process in the intra-picture prediction.

First, the picture 403 that has been already reproduced in a past process is called a reference picture, on which the search region 405 is set. In FIG. 5, the search region 405 is set around the region 404 located at the spatially same position as the target block 402. The search region 405, however, may be set at a spatially shifted position. Next, in the search region 405, the sum of absolute differences (SAD) between corresponding pixels is found for pixel groups each having the same shape as the target block 402. The region 406 is identified that gives the lowest SAD. The region 406 is considered as a type 1 candidate prediction signal. In this regard, another evaluation value for searching for the region 406 may be acceptable besides the SAD. The amount of displacement from the region 404 to the region 406 is detected as the motion vector 407 of the target block. Though FIG. 5 shows one reference picture, there is also a method in which the motion vector is searched in search regions set on a plurality of already reproduced pictures. In this case, a reference picture number that identifies the already reproduced picture to which the detected motion vector belongs is included in the motion information. In the intra-picture prediction method, the reference picture number does not need to be encoded because a search region 439 is set within the target picture 401 as shown in FIG. 20(a). In FIG. 20(a), a region 431 shows a region that gives the lowest SAD corresponding to the target block 402 while a motion vector 432 indicates the amount of displacement from the target region 402 to the region 431.

Figure 2:
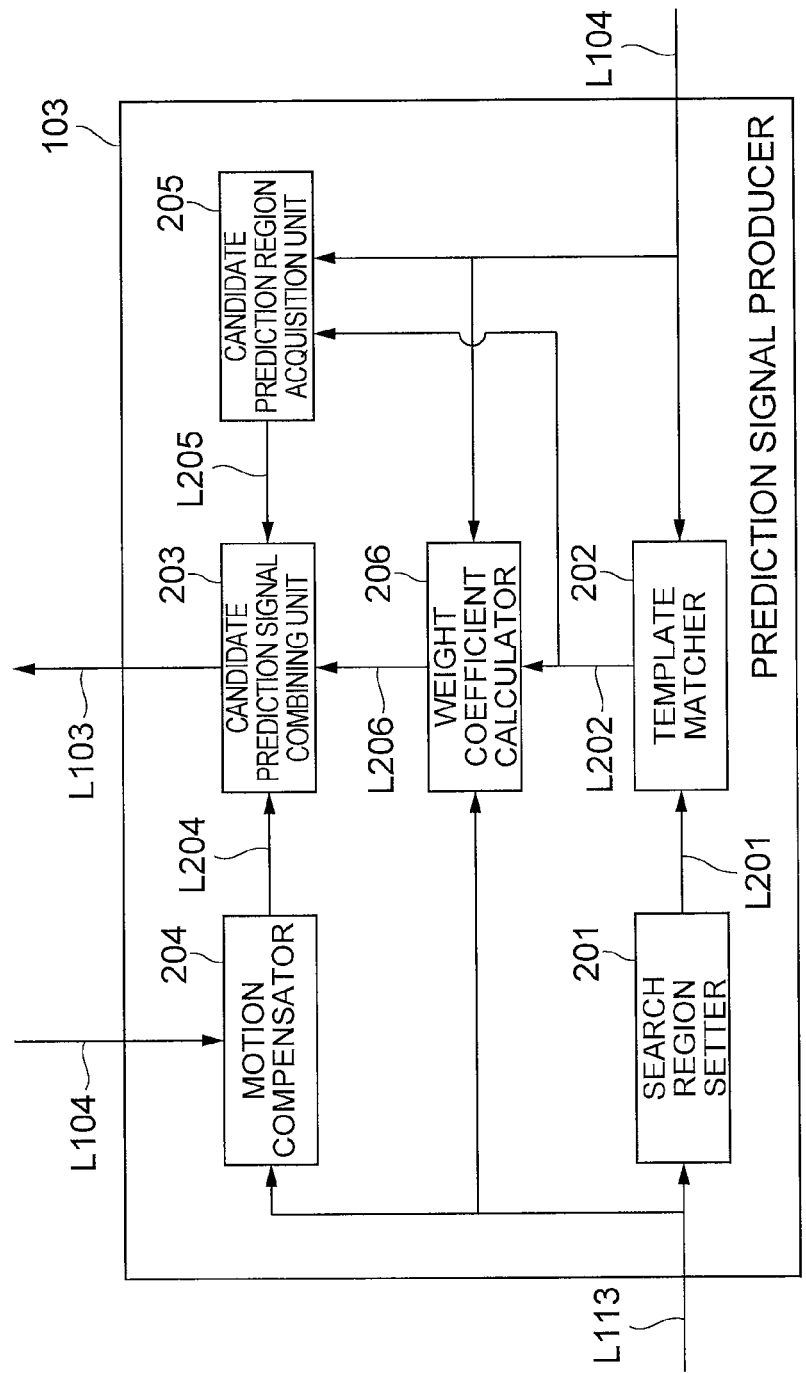
FIG. 2 is a block diagram showing a prediction signal generator shown in FIG. 1.

Next, the production process of the prediction signal of the target block by the prediction signal generator 103 is described by taking as an example the inter-picture prediction method. FIG. 2 is a block diagram of the prediction signal generator 103. The prediction signal generator 103 includes a search region setter 201 (search region determination unit), a template matcher 202 (template matching unit), a candidate prediction signal combining unit 203 (candidate prediction signal combining unit), a motion compensator 204 (motion compensation unit), a candidate prediction region acquisition unit 205 (included in the template matching unit), and a weight coefficient calculator 206 (included in the candidate prediction signal combining unit). In the prediction signal generator 103, the search region setter 201 sets, on an already reproduced picture, a search region that is the target of template matching based on the above-described motion information, and the template matcher 202 searches for, from the search region, a plurality of candidate prediction signals (type 2 candidate prediction signals) corresponding to the target block. The motion compensator 204 and the candidate prediction region acquisition unit 205 derives the candidate prediction signals (the type 1 candidate prediction signal and the type 2 candidate prediction signals, respectively) from already reproduced signals. The candidate prediction signal combining unit 203 combines the candidate prediction signals by weighted averaging with weight coefficients determined by the weight coefficient calculator 206, and produces the prediction signal with respect to the target block.

In the process, the prediction signal generator 103 produces the prediction signal based on the motion information that is produced by the motion estimator 113 and input through L113 to the prediction signal generator 103. The motion information is also input to the search region setter 201, the motion compensator 204, and the weight coefficient calculator 206. That is, the image signal of the prediction region 406 having a lower difference with the image signal of the target block 402 is selected as one of the candidate prediction signals (the type 1 candidate prediction signal, and the region 406 is a type 1 candidate prediction region), thereby achieving improvement of prediction performance. That is, the prediction signal generator 103 includes the motion compensator 204 (motion compensation unit), which derives the type 1 candidate prediction signal from the reference picture (the first reproduction picture) in the frame memory 104 based on the motion information input through L113, and outputs the type 1 candidate prediction signal to the candidate prediction signal combining unit 203. The search region setter 201 determines a reference picture (a second reproduction picture) and a search region based on the motion information input through L113, and outputs the reference picture and the search region to the template matcher 202 through L201.

The template matcher 202 searches for one or more candidate prediction signals (type 2 candidate prediction signals) from the above-described search region (a part of the reference picture in the frame memory 104) and outputs access information for deriving the searched signals from the second reproduction picture to the candidate prediction region acquisition unit 205 through L202. The candidate prediction region acquisition unit 205 derives the type 2 candidate prediction signals from the reference picture (the second reproduction picture) in the frame memory 104, and outputs the signals to the candidate prediction signal combining unit 203. In this way, the search region with respect to another candidate prediction signal (type 2 candidate prediction signals) is determined by the reference picture and the motion vector based on the above-described motion information, thereby enabling the candidate prediction signal to be searched in a narrow search region with high efficiency. Here, the number of type 2 candidate prediction signals is not limited as long as it is one or more.

(Description of the Search Region Setter 201)

Figure 6:
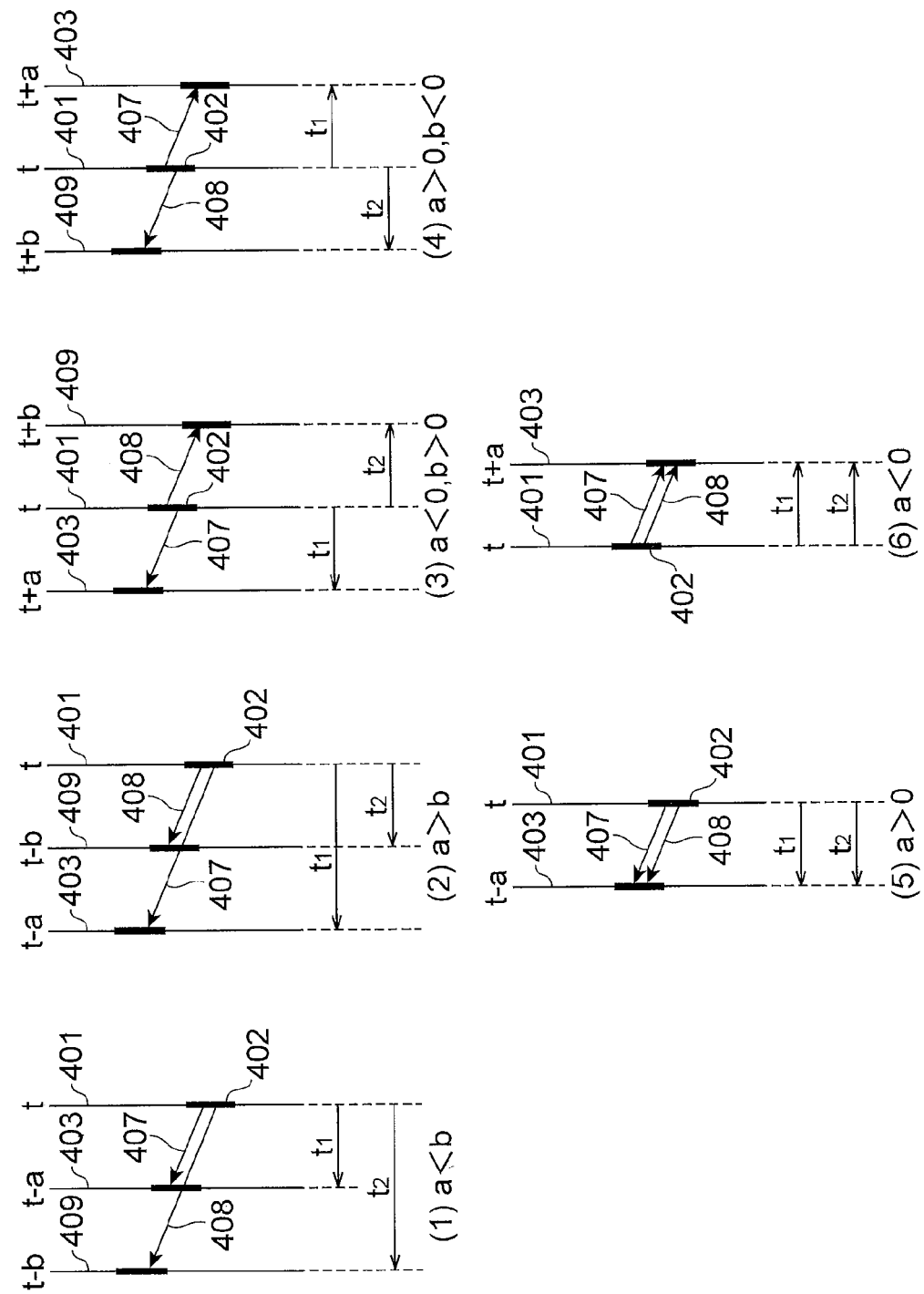
FIG. 6 is a schematic view of a search region setting process.

The search region setter 201 determines a reference picture and a search region for searching for the type 2 candidate prediction signals based on the motion information input through L113. FIG. 6 is a view to describe a method for selecting a reference picture 409 from a plurality of reproduction pictures and a method for determining a center position (search center) of the search region. In the reference picture 409, the type 2 candidate prediction signals corresponding to the target block 402 within the target picture 401 to be conceded is searched. In this example, a reproduction picture is selected from candidate reference pictures constituted with already reproduced signals as the reference picture (the second reproduction picture) for searching for the type 2 candidate prediction signals. The selected reproduction picture is temporally closest to the target picture 401, and different from the reference picture 403 (in which the type 1 candidate prediction signal is searched: the first reproduction picture) indicated by the motion information.

In FIG. 6(1) and FIG. 6(2), the reference picture 409 is shown in a case where all of the candidate reference pictures are the past pictures in terms of time to the target picture to be encoded. As shown in FIG. 6(1), in a case where the reference picture 403 (time t−a) indicated by the motion information is temporally closest to the target picture 401 (time t) in the candidate reference pictures, a past reference picture (t−b, a<b) in terms of time to the picture 403 is selected as the reference picture 409 for searching for the type 2 candidate prediction signals. As shown in FIG. 6(2), in a case where another candidate reference picture is present between the reference picture 403 (time t−a) indicated by the motion information and the target picture 401 (time t), a reference picture (t−b, a<b) temporally closest to the target picture 401 (time t) is selected from the pictures between two pictures as the reference picture 409 for searching for the type 2 candidate prediction signals.

In FIG. 6(3) and FIG. 6(4), the reference picture 409 is shown in a case where the candidate reference pictures include a future picture in terms of time to the target picture to be encoded. As shown in FIG. 6(3), in a case where the reference picture 403 (time t+a, a<0) indicated by the motion information is the past picture in terms of time to the target picture 401 (time t) in the candidate reference pictures, a picture (time t+b, b>0) that is in the future in terms of time and the closest to the target picture 401 is selected as the reference picture 409 for searching for the type 2 candidate prediction signals. As shown in FIG. 6(4), in a case where the reference picture 403 (time t+a, a>0) indicated by the motion information is a future picture in terms of time to the target picture 401 (time t) in the candidate reference pictures, a picture (time t+b, b<0) that is in the past in terms of time and the closest to the target picture 401 is selected as the reference picture 409 for searching for the type 2 candidate prediction signals.

In the case where the future picture in terms of time to the target picture to be encoded can be used for producing the prediction signal as shown in FIG. 6(3) and FIG. 6(4), selecting the reference picture 409 (the second reproduction picture) in a temporally opposite direction to the reference picture 403 (the first reproduction picture) relative to the picture 401 can achieve a prediction efficiency improvement effect by bidirectional prediction.

In FIG. 6(5) and FIG. 6(6), the reference picture 409 is shown in the case of one candidate reference picture. In the diagrams, the reference picture 409 for searching for the type 2 candidate prediction signals and the reference picture 403 indicated by the motion information are the same. Here, also in the case where the number of candidate reference pictures is not one, the reference picture 403 identified by the reference picture number included in the motion information may be selected as the reference picture 409 for searching for the type 2 candidate prediction signals.

The search center that is the center position of the search region is determined by scaling, on the reference picture 409, the motion vector 407 included in the motion information and inter-picture time differences (t1 and t2, respectively). The differences are between the target picture 401 and the reference picture 403 indicated by the motion information, and between the target picture 401 and the reference picture 409 for searching for the type 2 candidate prediction signals. Formula (1) represents the motion vector 407 included in the motion information. Formula (2) represents a scaling motion vector 408 obtained by scaling the motion vector 407 on the reference picture 409.

[Formula 1]

$$MV = (mv_x, mv_y) \quad (1)$$

[Formula 2]

$$scaledMV = ((t_2 \times mv_x)/t_1, (t_2 \times mv_y)/t_1) \quad (2)$$

The search region is set within the reference picture 409 with a pixel position indicated by the scaling motion vector 408 as a center. In this regard, when the horizontal or vertical component value of the scaling motion vector 408 includes a decimal fraction, such as a half-pixel and a quarter-pixel, the value may be rounded to an integer value. The size of the search region can be arbitrarily set, and is determined in advance. The size of the search region may also be encoded on a sequence basis or a picture basis.

FIG. 6 shows one reference picture 409 for searching for the type 2 candidate prediction signals. A plurality of reference pictures may be selected and the search region may be set for each picture. As described later, the type 2 candidate prediction signals are searched by using the already reproduced pixel group adjacent to the target region for searching for the candidate prediction signals. Therefore, even if the number of reference pictures to be searched is increased, the information of the reference picture does not need to be encoded for searching for the type 2 candidate prediction signals.

When the motion vector 407 and the scaling motion vector 408 are both zero vectors, a block signal at the search center position, i.e., the block signal indicated by the scaling motion vector, is omitted from the search target of template matching in the template matcher 202. This is because it is conceivable that the block signal at the search center position and the type 1 candidate prediction signal have a high possibility of being the same, so that an averaging effect is hardly obtained, in this case. Particularly, this tendency is strong in the case where the reference picture number included in the motion information identifies a temporally adjacent picture to the target picture as shown in FIG. 6(1). Because of this, the block signal at the search center position may be omitted from the search target of template matching only when the reference picture number is a specific value and when the motion vector 407 and the scaling motion vector 408 are both zero vectors. That is, the template matcher 202 preferably carries out a selection so that at least one of the components constituting the motion vector indicating the type 2 candidate prediction signals has a value other than zero, when the components constituting the motion vector have a value of zero and the search region belongs to a different picture from the reference picture 403 (the first reproduction picture).

When the intra-picture prediction is adopted, the search region setter 201 is not required. In the intra-picture prediction, the search center for searching for the type 2 candidate prediction signals is set on the target picture 401 at a pixel position indicated by the motion vector included in the motion information. In this case, the pixel position of the search center shows the type 1 candidate prediction signal, so that the position is omitted from the search target.

When the reference picture 409 for searching for the type 2 candidate prediction signals and the reference picture 403 indicated by the motion information are the same as shown in FIG. 6(5) and FIG. 6(6), the scaling motion vector 408 coincides with the motion vector 407. In this case, the pixel position of the search center shows the type 1 candidate prediction signal, so that the position is omitted from the target for searching for the type 2 candidate prediction signals. Here, the pixel position of the search center is also omitted from the target for searching for the type 2 candidate prediction signals when the reference picture 403 identified by the reference picture number included in the motion information is selected as the reference picture 409 for searching for the type 2 candidate prediction signals, regardless the case of one candidate reference picture.

As a result of putting together three cases shown herein, the block signal indicated by the scaling motion vector 408 may be omitted from the search target of template matching for searching for the type 2 candidate prediction signals. In addition, the type 2 candidate prediction signals may be set in such a limited way that they are different signals from the type 1 candidate prediction signal while the type 2 candidate prediction signals may be set in such a limited way that they do not include the type 1 candidate prediction signal.

(Description of the Template Matcher 202)

The template matcher 202 searches for the type 2 candidate prediction signal in a plurality of numbers from the search region within the reference picture based on the reference picture input through L201 and information of the search region. In template matching, a region resembling a target adjacent region composed of a reproduction pixel group adjacent to the target block is searched from a reproduction signal. Description is made with reference to FIG. 3 and FIG. 7.

Figure 3:
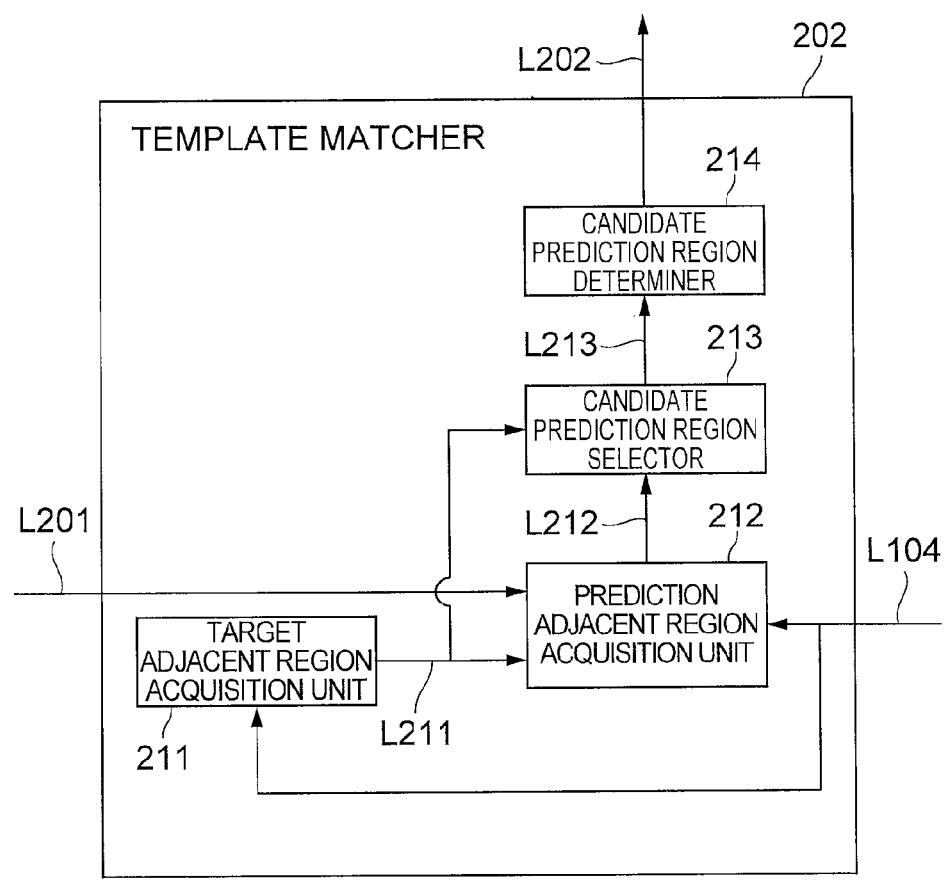
FIG. 3 is a block diagram showing a template matcher shown in FIG. 2.

FIG. 3 is a block diagram showing the structure of the template matcher 202. The template matcher 202 is provided with a target adjacent region acquisition unit 211, a prediction adjacent region acquisition unit 212, a candidate prediction region selector 213, and a candidate prediction region determiner 214.

(Description of the Template Matcher 202 in Inter-Picture Prediction)

Figure 7:
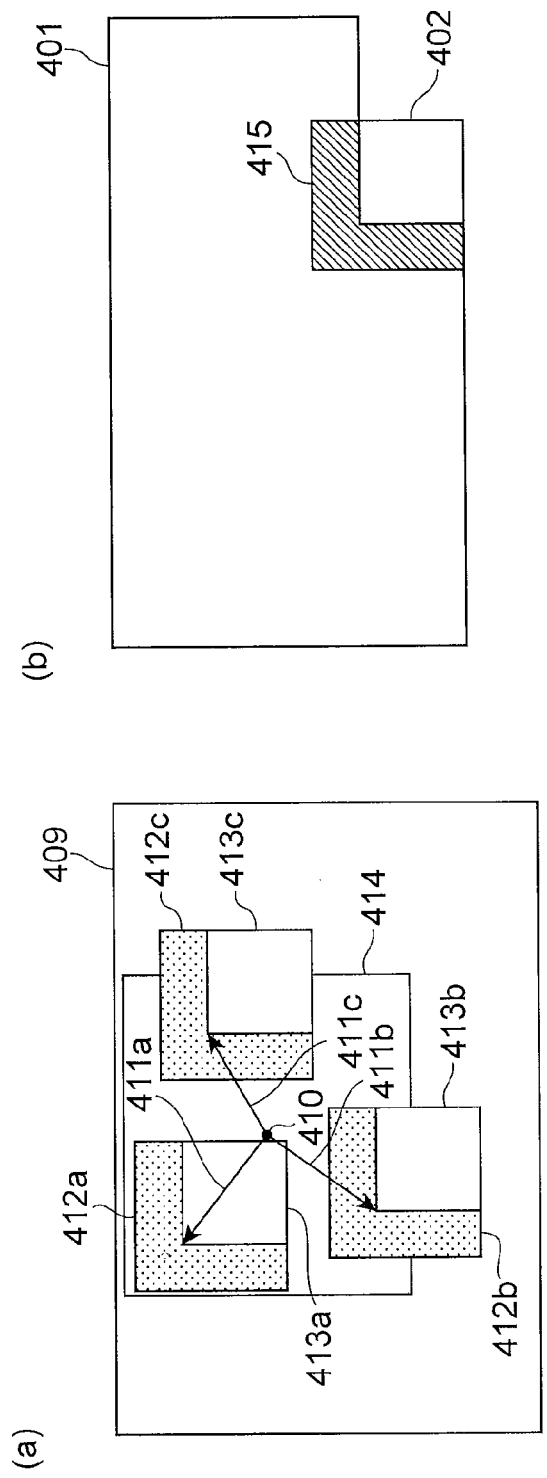
FIG. 7 is a schematic view of a template matching process in inter-picture prediction.

FIG. 7 is a view to describe a method for searching for the type 2 candidate prediction signal in a plurality of numbers in the template matcher 202 in the case of inter-picture prediction. The type 2 candidate prediction signal is searched in a plurality of numbers from a search region 414 within the reference picture 409. A coordinate 410 shows the search center.

First, the target adjacent region acquisition unit 211 derives, from the frame memory 104 through L104, a target adjacent region (also referred to as a template) corresponding to the target block by a predetermined method. The acquired template signal is output to the prediction adjacent region acquisition unit 212 and the candidate prediction region selector 213 through L211. In the present embodiment, an already reproduced pixel group 415 (region having a reversed L-shape) adjacent to the target block 402 is the target adjacent region. The target adjacent region 415 needs to be composed of the reproduced pixels around the target block 402. The shape and the number of pixels can be arbitrarily set, and are determined in advance. In addition, the shape and the size (the number of pixels) of the template can be encoded on a sequence basis, a picture basis, or a block basis.

Next, the prediction adjacent region acquisition unit 212 sequentially derives, from the frame memory through L104, pixel groups each having the same shape as the target adjacent region 415 which is located in the search region 414 on the reference picture 409 input through L201. The pixel groups obtained are output to the candidate prediction region selector 213 through L212.

The candidate prediction region selector 213 sequentially obtains the sum of absolute differences (SAD) of corresponding pixels between the target adjacent region 415 input through L211 and the pixel groups that each has the same shape as the target adjacent region 415 and are input through L212. Then, the first M of regions with the lowest SAD are detected and selected as the type 2 candidate prediction adjacent regions. The pixel accuracy in the search region 414 can be on an integer pixel basis. The search can also be carried out with decimal fraction pixel accuracy by preparing pixels having decimal fraction accuracy, such as a half-pixel and a quarter-pixel. The value of M can be arbitrarily set as long as it is set in advance. In FIG. 7, M=3, and candidate prediction adjacent regions 412a, 412b, and 412c are detected.

The candidate prediction region selector 213 determines regions 413a, 413b, and 413c adjacent to regions 412a, 412b, and 412c as the type 2 candidate prediction regions corresponding to the target block 402. The pixel signal within each candidate prediction region is assigned as the type 2 candidate prediction signals, respectively. The positional relation between the candidate prediction adjacent region and the candidate prediction region is the same as that between the target region and the target adjacent region, here. The positional relationship, however, is not necessarily required to be the same. Lastly, the candidate prediction region selector 213 outputs difference coordinates 411a, 411b, and 411c between the target adjacent region (and target region) and each candidate prediction adjacent region (and candidate prediction region), and the reference picture numbers of the reference pictures, in which each candidate prediction region is located, to the candidate prediction region determiner 214 through L213 as access information for deriving each candidate prediction adjacent region and each candidate prediction region from the frame memory 104.

The candidate prediction region determiner 214 selects one candidate prediction region from three of type 2 candidate prediction regions (in FIG. 7, but not limited to three). As a candidate prediction region selection method, there is a method in which the candidate prediction region selector 213 in the template matcher 202 selects a candidate prediction signal adjacent to a candidate prediction adjacent region having a low SAD corresponding to the target adjacent region (another example is described later). The candidate prediction region determiner 214 outputs access information (the difference coordinate and reference picture number) for identifying the type 2 candidate prediction region which is selected to the candidate prediction region acquisition unit 205 and the weight coefficient calculator 206 through L202.

(Description of the Template Matcher 202 in Intra-Picture Prediction)

In intra-picture prediction, the template matcher 202 searches for the type 2 candidate prediction signal in a plurality of numbers as shown in FIG. 20(b). The type 2 candidate prediction signal is searched in a plurality of numbers from a search region 437 within the reference picture 401. A coordinate 438 shows the search center.

First, the target adjacent region acquisition unit 211 derives, from the frame memory 104 through L104, the target adjacent region (also referred to as the template) corresponding to the target block by a predetermined method. The acquired template signal is output to the prediction adjacent region acquisition unit 212 and the candidate prediction region selector 213 through L211. In the present embodiment, an already reproduced pixel group 415 (region having a reversed L-shape) adjacent to the target block 402 is the target adjacent region. The target adjacent region 415 needs to be composed of the reproduced pixels around the target block 402 at lease. The shape and the number of pixels can be arbitrarily set, and are determined in advance. In addition, the shape and the size (the number of pixels) of the template can be encoded on a sequence basis, a picture basis, or a block basis.

Next, the prediction adjacent region acquisition unit 212 sequentially derives, from the frame memory through L104, pixel groups each having the same shape as the target adjacent region 415 which are located in the search region 437 on the reference picture 401 input through L201. The acquired pixel groups are output to the candidate prediction region selector 213 through L212.

The candidate prediction region selector 213 sequentially obtains the sum of absolute differences (SAD) of corresponding pixels between the target adjacent region 415 input through L211 and the pixel groups that each has the same shape as the target adjacent region 415 and are input through L212. Then, M of regions with the lowest SAD are detected and selected as the type 2 candidate prediction adjacent regions. The pixel accuracy in the search region 437 can be on an integer pixel basis. The search can also be carried out with decimal fraction pixel accuracy by preparing pixels having decimal fraction accuracy, such as a half-pixel and a quarter-pixel. The value of M can be arbitrarily set as long as it is set in advance. In FIG. 20(b), M=3, and candidate prediction adjacent regions 436a, 436b, and 436c are detected.

The candidate prediction region selector 213 determines regions 435a, 435b, and 435c adjacent to regions 436a, 436b, and 436c as the type 2 candidate prediction regions corresponding to the target block 402. The pixel signals within candidate prediction regions are the type 2 candidate prediction signals, respectively. The positional relation between the candidate prediction adjacent region and the candidate prediction region is the same as that between the target region and the target adjacent region, here. The positional relationship, however, is not necessarily required to be the same. Lastly, the candidate prediction region selector 213 outputs difference coordinates 434a, 434b, and 434c between the target adjacent region (and target region) and each candidate prediction adjacent region (and candidate prediction region), and the reference picture numbers of the reference pictures, in which each candidate prediction region is located, to the candidate prediction region determiner 214 through L213 as access information for deriving each candidate prediction adjacent region and each candidate prediction region from the frame memory 104. The candidate prediction region determiner 214 selects one candidate prediction region from three of type 2 candidate prediction regions (in FIG. 20, but not limited to three). As a candidate prediction region selection method, there is a method in which the candidate prediction region selector 213 in the template matcher 202 selects a candidate prediction signal adjacent to a candidate prediction adjacent region with a low SAD corresponding to the target adjacent region (another example is described later). The candidate prediction region determiner 214 outputs access information (the difference coordinate and reference picture number) for identifying the type 2 candidate prediction region which is selected to the candidate prediction region acquisition unit 205 and the weight coefficient calculator 206 through L202.

(Description of the Template Matcher in Dividing the Target Block)

In FIG. 7, the block size of the type 1 candidate prediction region 406, the type 2 candidate prediction regions 413a, 413b, 413c, and the target block 402 are the same. If the candidate prediction region is divided into a smaller block than the target block 402 to produce a prediction signal with respect to each small divided target block, it can be expected to further improve prediction performance. Because of this, in the present embodiment, the case is described where the target block 402 is divided into four blocks, and a prediction signal production process is carried out on a divided block basis.

The type 1 candidate prediction signal is produced with respect to four small target blocks obtained by dividing the type 1 candidate prediction region 406 into quarters in order to suppress increasing of motion information. In other words, the type 1 candidate prediction signal with respect to four small target blocks is produced based on the same motion information.

Figure 8:
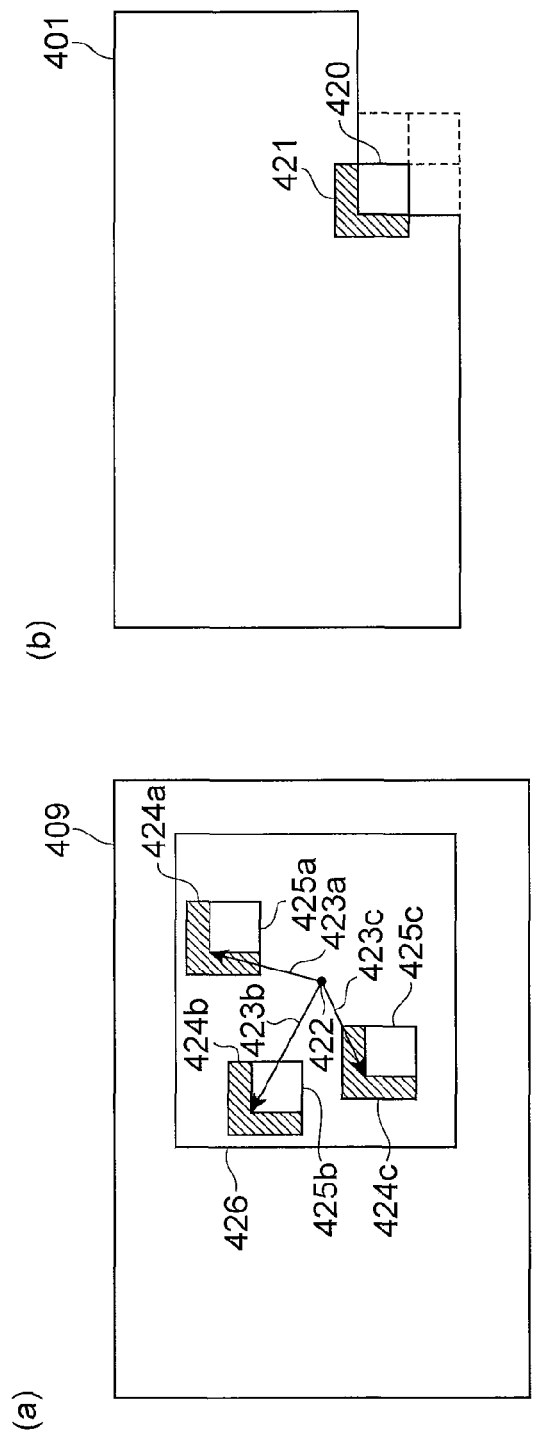
FIG. 8 is a first schematic view of a modification example of the template matching process in the inter-picture prediction.

FIG. 8 is a view to describe a method in which the template matcher 202 searches for the type 2 candidate signal in a plurality of numbers with respect to the small target block in inter-picture prediction. The view shows an example of a small target block 420 in four divided blocks. The type 2 candidate prediction signal is searched in a plurality of numbers from a search region 426 within the reference picture 409. A coordinate 422 shows the search center. Here, the search region 426 and the coordinate 422 are shifted from the search region 414 and the coordinate 410 to according to the difference between the left upper end coordinate of the target block 402 and the left upper end coordinate of the small target block.

The process procedure of the template matcher is almost the same as that of FIG. 7. In the present embodiment, an already reproduced pixel group 421 (region having a reversed L-shape) adjacent to the small target block 420 is the target adjacent region.

Then, based on the search region 426 on the reference picture 409 input through L201, the sum of absolute differences (SAD) of corresponding pixels is sequentially obtained between the pixel of the target adjacent region 421 and the pixel groups within the search region, each pixel group having the same shape as the target adjacent region 421. Then, M of regions with the lowest SAD are detected. They are prediction adjacent regions. The value of M can be arbitrarily set as long as it is set in advance. In FIG. 8, M=3, and candidate prediction adjacent regions 424a, 424b, and 424c are detected.

Regions 425a, 425b, and 425c adjacent to regions 424a, 424b, and 424c are determined as the type 2 candidate prediction regions with respect to the small target block 421. The pixel signals within candidate prediction regions are determined as the type 2 candidate prediction signals, respectively. Difference coordinates 423a, 423b, and 423c between the target adjacent region (and target region) and each candidate prediction adjacent region (and candidate prediction region), and the reference picture numbers of the reference pictures, in which each candidate prediction region is located, are output to the candidate prediction region determiner 214 through L213 as access information for deriving each candidate prediction adjacent region and each candidate prediction region from the frame memory 104. The candidate prediction region determiner 214 selects one candidate prediction region from three type 2 candidate prediction regions (in FIG. 8, but not limited to three). As a candidate prediction region selection method, there is a method in which the candidate prediction region selector 213 of the template matcher 202 selects a candidate prediction signal adjacent to a candidate prediction adjacent region with a low SAD corresponding to the target adjacent region (another example is described later). The candidate prediction region determiner 214 outputs access information (the difference coordinate and reference picture number) for identifying the type 2 candidate prediction region which is selected to the candidate prediction region acquisition unit 205 and the weight coefficient calculator 206 through L202.

Figure 21:
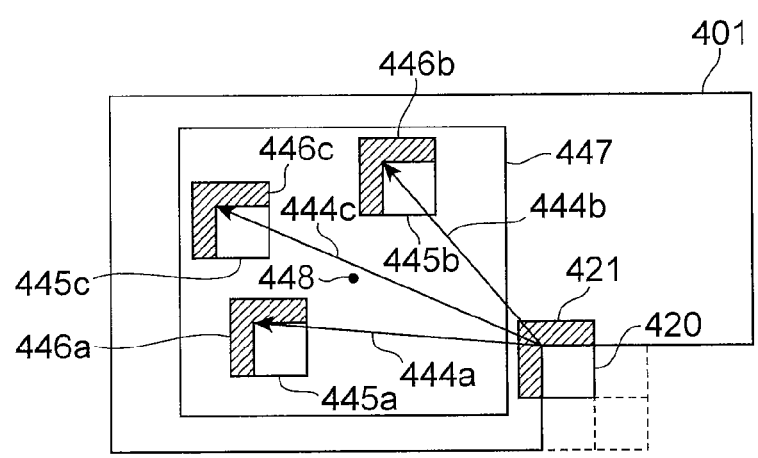
FIG. 21 is a schematic view of a modification example of the template matching process in the intra-picture prediction.
Figure 22:
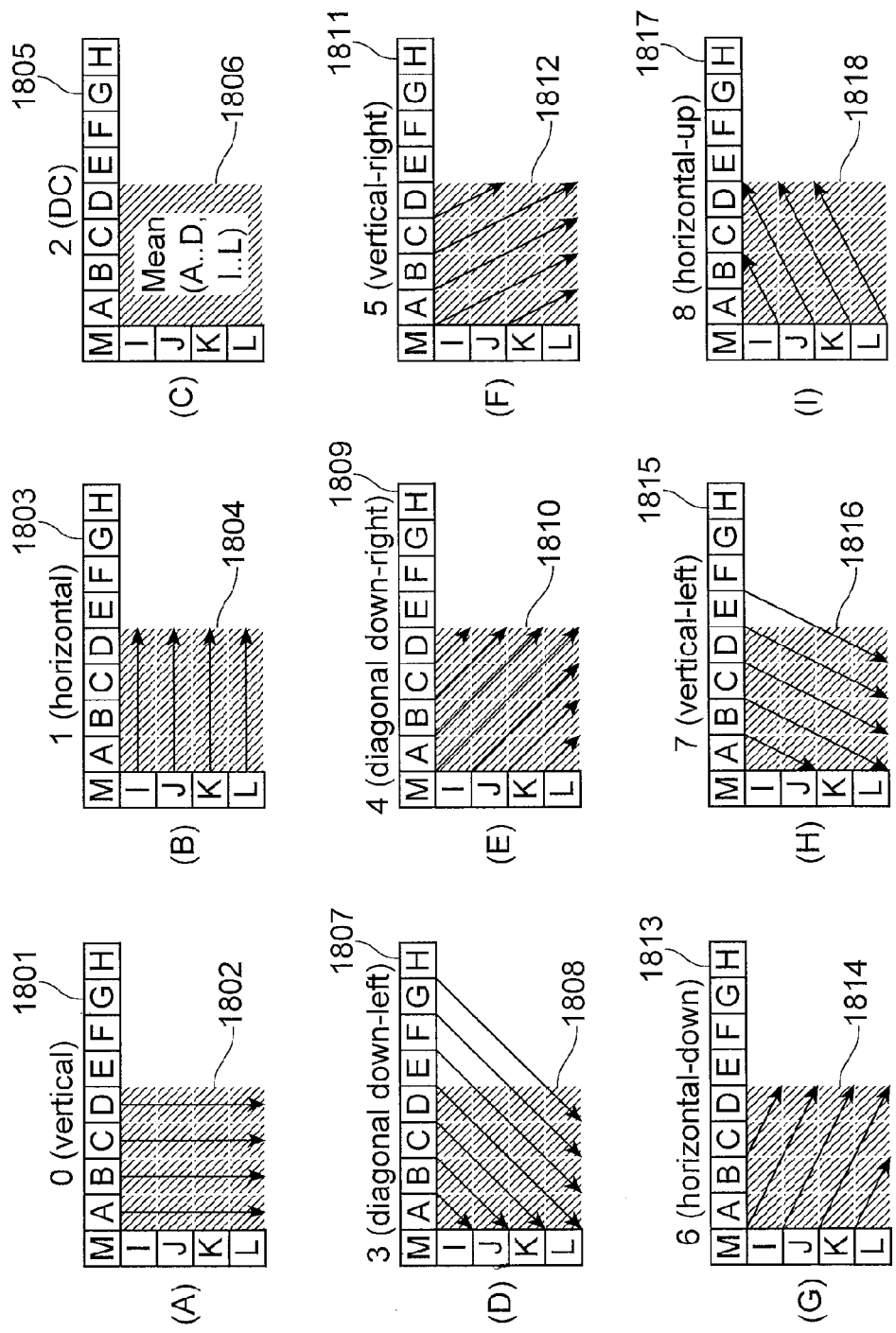
FIG. 22 is a schematic view to describe a prior art intra-picture prediction method.

FIG. 21 is a view to describe a method in which the template matcher 202 searches for one or more type 2 candidate signals corresponding to the small target block in intra-picture prediction. The view shows an example of the small target block 420 in four divided blocks. One or more type 2 candidate prediction signals are searched from a search region 447 within the reference picture 401. A coordinate 448 shows the search center. Here, the search region 447 and the coordinate 448 are shifted from the search region 437 and the coordinate 438 according to the difference between the left-top corner of the target block 402 and the left-top corner of the small target block.

The process procedure of the template matcher is almost the same as that of FIG. 20(b). In the present embodiment, the already reproduced pixel group 421 (region having a reversed L-shape) adjacent to the small target block 420 is the target adjacent region.

Then, based on the target adjacent region 447 on the reference picture 401 input through L201, the sum of absolute differences (SAD) of corresponding pixels is sequentially obtained between the pixel of the target adjacent region 421 and the pixel groups within the search region, each pixel group having the same shape as the target adjacent region 421. Then, M of regions with lowest SAD are detected. They are prediction adjacent regions. The value of M can be arbitrarily set as long as it is set in advance. In FIG. 21, M=3, and candidate prediction adjacent regions 446a, 446b, and 446c are detected.

Regions 445a, 445b, and 445c adjacent to regions 446a, 446b, and 446c are determined as the type 2 candidate prediction regions with respect to the small target block 421. The pixel signals within candidate prediction regions are determined as the type 2 candidate prediction signals, respectively. Difference coordinates 444a, 444b, and 444c between the target adjacent region (and target region) and each candidate prediction adjacent region (and candidate prediction region), and the reference picture numbers of the reference pictures, in which each candidate prediction region is located, are output to the candidate prediction region determiner 214 through L213 as access information for deriving each candidate prediction adjacent region and each candidate prediction region from the frame memory 104. The candidate prediction region determiner 214 selects one candidate prediction region from three of type 2 candidate prediction regions (in FIG. 21, but not limited to three). As a candidate prediction region selection method, there is a method in which the candidate prediction region selector 213 in the template matcher 202 selects a candidate prediction signal adjacent to a candidate prediction adjacent region with a low SAD corresponding to the target adjacent region (another example is described later). The candidate prediction region determiner 214 outputs access information (the difference coordinate and reference picture number) for identifying the type 2 candidate prediction regions which are selected to the candidate prediction region acquisition unit 205 and the weight coefficient calculator 206 through L202.

The prediction signals for the other three small target blocks can be produced in the same manner of the small target block 421 if the size of the block to be transformed and quantized in FIG. 1, and the size of the small target block are the same. However, if the size of the block to be transformed and quantized in FIG. 1 is larger than that of the small target block, a part or whole of the signal of the reversed L-shape region adjacent to the small target region is not yet reproduced. In this case, a predicted pixel can be used instead of the reproduced pixel. Additionally, the template shape can be so changed that the template can be composed of the reproduced pixels depending on the location of the small target block within the target block.

The method of producing the prediction signal corresponding to the target block and the method of producing the prediction signal corresponding to each small block divided from the target block, both of which are described above, can be selected on a block basis. In this case, selection information is output to the entropy encoder 111 together with the motion information and so on.

(Description of the Weight Coefficient Calculator 206 and the Candidate Prediction Signal Combining Unit 203)

The weight coefficient calculator 206 calculates weight coefficients which is used for weighted-averaging of the type 1 candidate prediction signal and the type 2 candidate prediction signal based on the motion information input through L113 and the access information input through L202, and outputs the weight coefficients to the candidate prediction signal combining unit 203 through L206. The candidate prediction signal combining unit 203 receives the type 1 candidate prediction signal, which is derived by the motion compensator 204, and the type 2 candidate prediction signal, which is derived by the candidate prediction region acquisition unit 205, from the memory frame 104 through L204 and L205, respectively. The candidate prediction signal combining unit 203 weighted-averages these candidate prediction signals based on the weight coefficients input through L206 to produce the prediction signal according to the target block, and outputs the prediction signal through L103.

Figure 4:
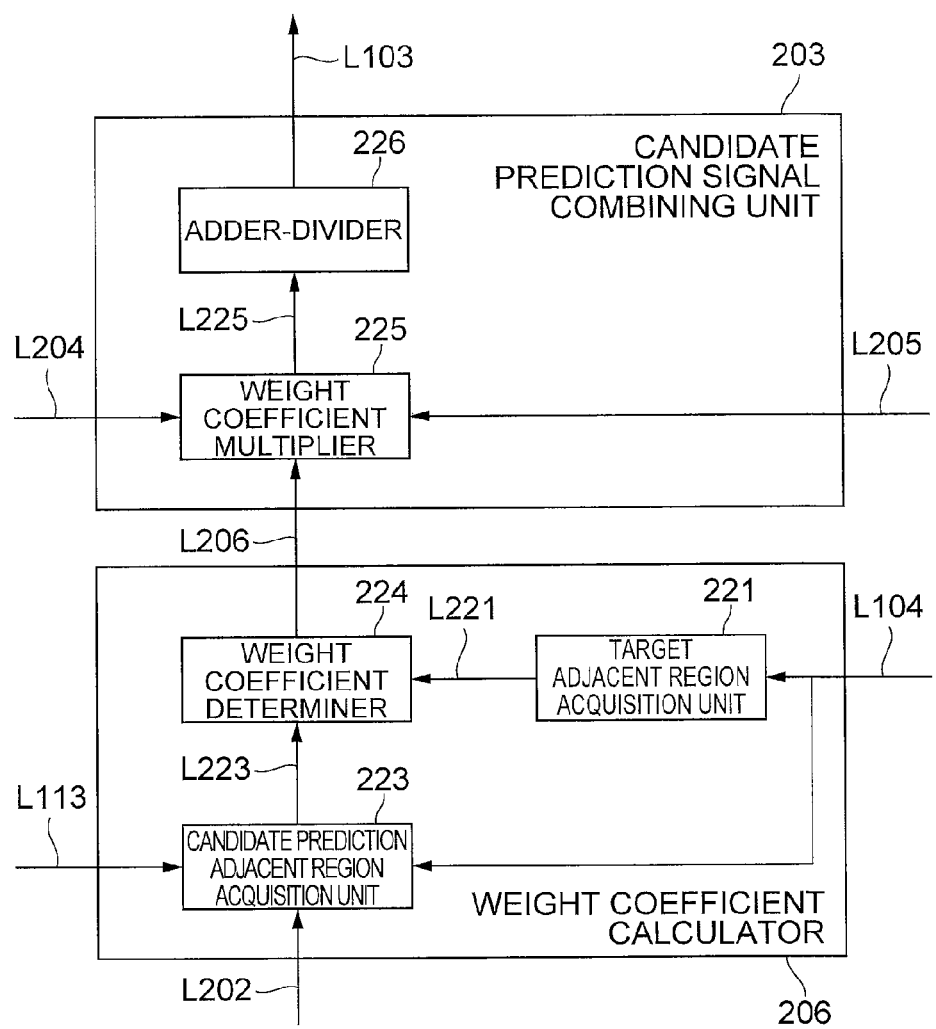
FIG. 4 is a candidate prediction signal combining unit and a weight coefficient calculator shown in FIG. 2.

FIG. 4 is a block diagram showing the structures of the weight coefficient calculator 206 and the candidate prediction signal combining unit 203. The weight coefficient calculator 206 is provided with a candidate prediction adjacent region acquisition unit 223, a target adjacent region acquisition unit 221, and a weight coefficient determiner 224. The candidate prediction signal combining unit 203 is provided with a weight coefficient multiplier 225 and an adder-divider 226.

Using formula (3), the production procedure, in weighted averaging processing, of a prediction signal $P_b$ (i, j) which is produced by the weight coefficient calculator 206 and the candidate prediction signal combining unit 203 is explained. Here, (i, j) represents the coordinates of each pixel in the target region.

[Formula 3]

$$P_b(i,j)=(w_0 \times p_0(i,j)+w_1 \times p_1(i,j)+ \ldots +w_{N-1} \times p_{N-1}(i,j))/(w_0+w_1+ \ldots +w_{N-1}) \quad (3)$$

In formula (3), N represents the number of type 1 and type 2 candidate prediction signals, and N=2 in this example (another example is described later). The candidate prediction signal combining unit 203 receives N candidate prediction signals $p_n$ (i, j) (n=0 to Ñ 1) of N candidate prediction regions from the motion compensator 204 and the candidate prediction region acquisition unit 205.

Meanwhile, in the weight coefficient calculator 206, first, the candidate prediction adjacent region acquisition unit 223 derives N candidate prediction adjacent signals $s_n$ (r) (n=0 to Ñ 1) of N candidate prediction adjacent regions from the frame memory 104 through L104 according to the access information input through L113 and L202, and outputs the signals to the weight coefficient determiner 224 through L223. The target adjacent region acquisition unit 221 derives a target adjacent signal t (r) of the target adjacent region (r represents the position of R pixels in the target adjacent region) from the frame memory 104 through L104, and outputs the signal to the weight coefficient determiner 224 through L221. The weight coefficient determiner 224 determines weight coefficients $w_n$ corresponding to N candidate prediction signals based on N candidate prediction adjacent signals $s_n$ (r), which input through L223, and the target adjacent signal t (r), which input through L221 (details are described later). Then, the weight coefficient determiner 224 outputs, through the line L206, the weight coefficients $w_n$ to the weight coefficient multiplier 225 in the candidate prediction signal combining unit 203.

The weight coefficient multiplier 225 in the candidate prediction signal combining unit 203 multiplies the nth weight coefficient $w_n$ by the nth candidate prediction signal $p_n$ (i, j) for each pixel, and outputs the result to the adder-divider 226 through L225. The adder-divider 226 cumulatively adds each pixel of N weighted candidate prediction signals, and thereafter the result is divided by the sum of the weight coefficients as shown in formula (3) to obtain the prediction signal $P_b$ (i, j) for each pixel.

(Description of Another Example of the Candidate Prediction Signal Determiner 214)

The method of determination on N in the candidate prediction region determiner 214 is further described. In the above description, the value of N is set as a predetermined value: N=2. N, however, does not depend on this value. For example, a method can be employed in which the prediction signal of the target adjacent region is produced by weighted-averaging any N candidate prediction adjacent signals, and N is so selected that the difference between the produced prediction signal and the target adjacent region becomes the lowest. In this case, mechanisms in the weight coefficient calculator 206 can be utilized.

Additionally, there is also a method, for example, for producing three prediction signals of a target adjacent signal by actually performing the weighted averaging process between a candidate prediction signal of a candidate prediction adjacent region adjacent to a first candidate prediction region and each candidate prediction adjacent signal of three candidate prediction adjacent regions. In the method, these prediction signals and the target adjacent signal are compared so as to select the candidate prediction signal of the candidate prediction region adjacent to the candidate prediction adjacent region that gives the lowest difference (for example, the sum of absolute differences) in the comparisons. N candidate prediction signals can be selected from the type 2 candidate prediction signals while the type 1 candidate prediction signal is excluded from the candidate prediction signals (in this case, the motion compensator 204 is not required). Alternatively, N candidate prediction signals can be selected from M+1 candidate prediction signals obtained by adding M of type 2 candidate prediction signals and the type 1 candidate prediction signal. In the same manner as described above, any N candidate prediction adjacent signals are selected from M+1 candidate prediction adjacent signals of the candidate prediction adjacent regions adjacent to candidate prediction adjacent regions as the selection method. The N candidate prediction adjacent signals are weighted-averaged to produce the prediction signal of the target adjacent region. In this case, N candidate prediction adjacent regions that give the lowest sum of absolute differences between the prediction signal and the target adjacent signal are selected. N candidate prediction signals of N candidate prediction regions adjacent to N candidate prediction adjacent regions are finally selected.

(Description of the Weight Coefficient Calculator 206)

The method of determination on the weight coefficient in the weight coefficient determiner 224 is further described. The weight coefficient can be obtained by a simple arithmetic average as shown in formula (4). N weight coefficients may also be determined based on the SAD between the target adjacent signal t (r) and N candidate prediction adjacent signals sn (r). In the former case, the weight coefficient calculator 206 is not required since the weight coefficient is predetermined.

[Formula 4]

$$w_p = 1/N \quad (4)$$

The latter method can determine the weight coefficients based on the correlation between N of candidate prediction regions and the target block. This method calculates N weight coefficients based on the SAD (LSAD$_n$: calculated by formula (6)) between the target adjacent signal t (r) (r represents the position of R pixels in the target adjacent region) and N candidate prediction adjacent signals $s_n$ (r) (n=0 to Ñ 1).

[Formula 5]

$$w_n = (LSAD_0 + LSAD_1 + \ldots + LSAD_N)/LSAD_n \quad (5)$$

[Formula 6]

$$LSAD_n = \Sigma_0^{r-1} |s_n(r) - t(r)| \quad (6)$$

As described above, according to the prediction method in the encoder of the present invention, a plurality of candidate prediction signals is produced based on the motion information, such as the motion vector detected by the encoder by using the original signal of the target block. The present invention estimates a pixel position close to the original signal of the target block by using motion information, enabling a plurality of candidate prediction signals to be produced with high efficiency in a narrow search range. These candidate prediction signals are derived from different regions in a picture. The noise components (particularly, high frequency component) included in the signals are individually low. Consequently, a prediction signal having less noise statistically can be produced by a smoothing effect obtained by averaging a plurality of candidate prediction signals having different noise components.

In addition, the prediction method in the encoder of the present invention can be employed or selected on a block basis together with the prediction signal production method by using motion information, and the method of producing a plurality of candidate prediction signals without motion information as described in Patent Document 5. The prediction method in the encoder of the present invention enhances each effect from a point of view of a performance trade-off between an increase in encoded volume resulted from encoding motion information and a reduction effect of prediction error signals. Therefore, a further improvement effect of encoding efficiency can be expected by employing and selecting these methods.

Figure 9:
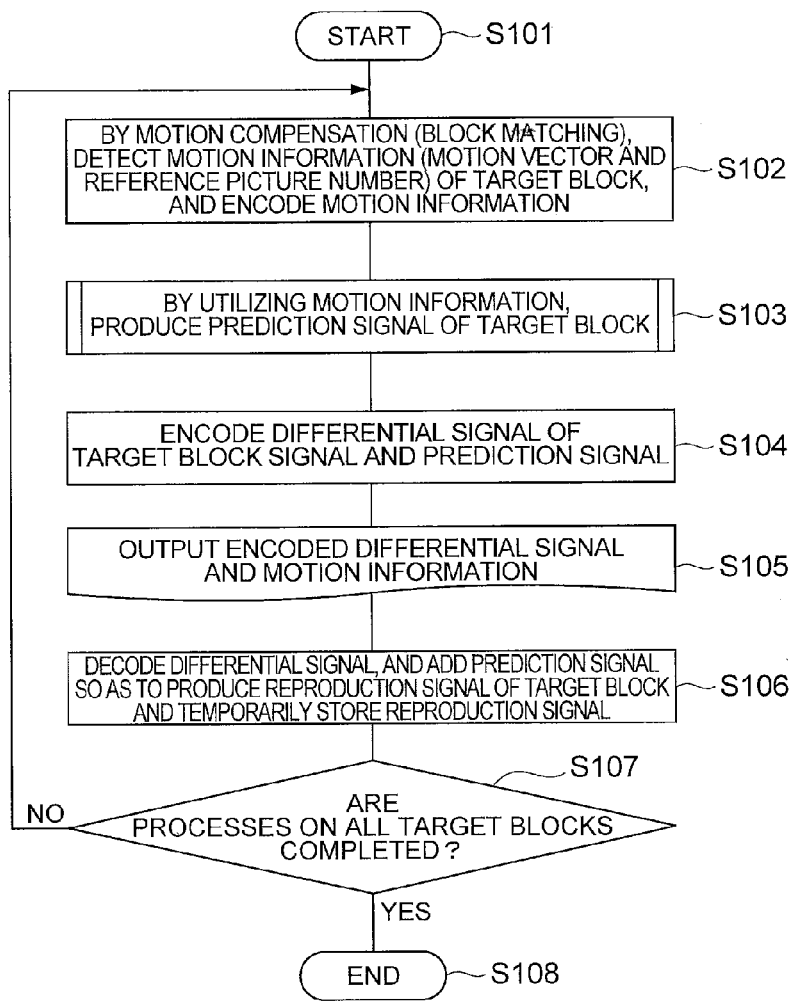
FIG. 9 is a flowchart showing the procedure on an image prediction encoding method of the image prediction encoding device shown in FIG. 1.

FIG. 9 is a flowchart showing the procedure of an image prediction encoding method in an image prediction encoding device 100 according to the present embodiment. First, the motion estimator 113 searches for a signal having high correlation with the target block from the already reproduced signal, and produces the motion information for producing the signal. That is, the motion estimator 113 detects the motion information (the motion vector 407 and the number of the reference picture 403) that indicates the type 1 candidate prediction region of the target block by the block matching process illustrated in FIG. 5 or FIG. 20(a). This motion information is encoded by the entropy encoder 111 (step S102). Then, the prediction signal generator 103 produces a plurality of candidate prediction signals based on the motion information, and produces the prediction signal of the target block as the result of the combining process of these signals (step S103). The detail of step S103 is described later with reference to FIG. 10.

A residual signal indicating the difference between the prediction signal determined in this way and the signal of the target block is encoded by the transformer 106, the quantizer 107, and the entropy encoder 111 (step S104). Then, the encoded residual signal, the encoded motion information, and encoded selection information of a prediction signal production method (if needed, selection of intra-picture prediction and inter-picture prediction, for example) are output through the output terminal 112 (step S105). Here, the motion information can include various kinds of setting information, such as the size of a search range of the type 2 candidate prediction signals and the value of N (the number of candidate prediction signals), in addition to the motion vector and the reference picture number in the inter-picture/the intra-picture prediction method.

After or in parallel with these processes, the residual signal encoded is decoded by the inverse quantizer 108 and the inverse transformer 109 for prediction encoding the subsequent target block. Then, the adder 110 adds the prediction signal to the decoded residual signal so as to reproduce the signal of the target block, and the reproduced signal is stored in the frame memory 104 as the reference picture (step S106). If the processes of all target blocks are not completed, the step returns to step S102 to process the subsequent target block. If the processes of all target blocks are completed, the process ends (step S107 and step S108).

Figure 10:
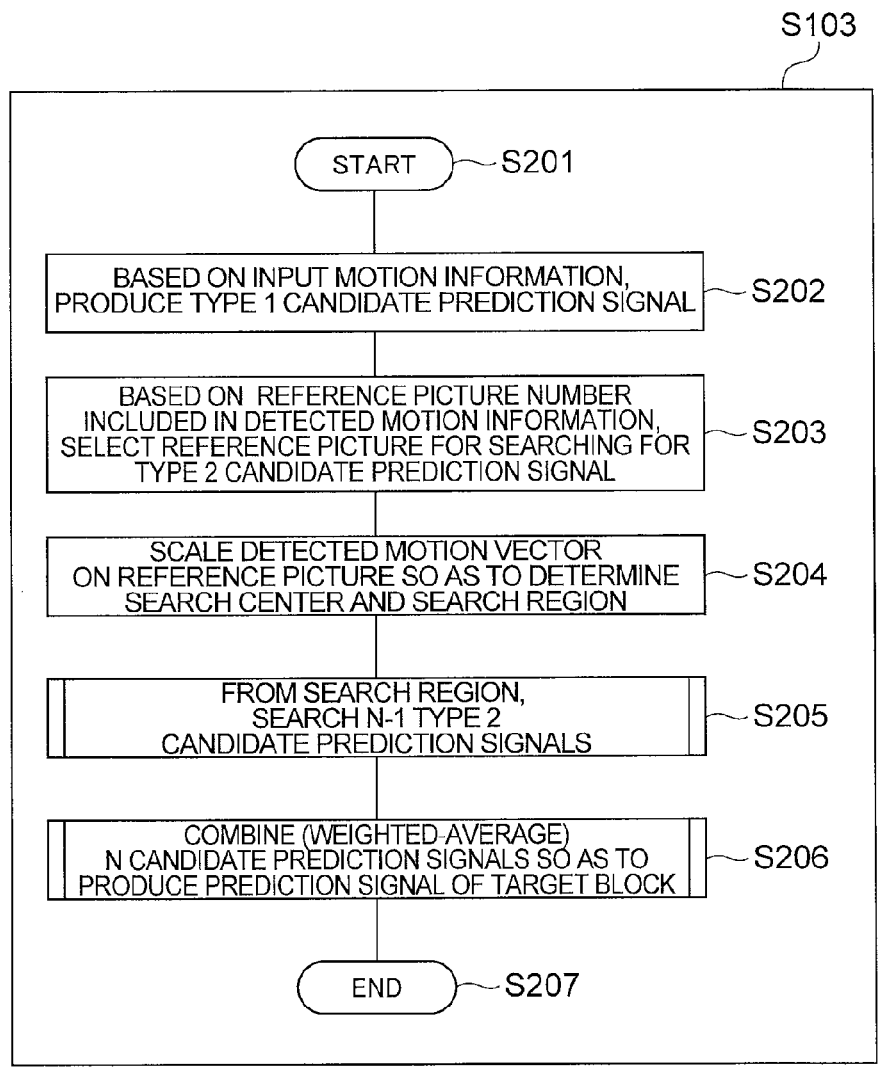
FIG. 10 is a flowchart to describe the procedure on a production method of a prediction signal.

FIG. 10 is a flowchart showing the detailed procedure of the prediction signal production method of the target block, the method being carried out by the prediction signal generator 103 in step S103.

First, the motion compensator 204 produces the type 1 candidate prediction signal based on the motion information detected in step S102 (step S202). The search region setter 201 selects the reference picture 409 for searching for the type 2 candidate prediction signals based on the reference picture number included in the above-described motion information in accordance with the procedure shown in FIG. 6 (step S203). Further, the search region setter 201 scales the motion vector 407 on the reference picture 409 according to formula (2), and determines the search center and the search region in accordance with the procedure shown in FIG. 7, FIG. 8, FIG. 20(b), or FIG. 21 (step S204). The template matcher 202 searches for N-1 type 2 candidate prediction signals from the search region (step S205, details are described later). Then, the candidate prediction region combining unit 203 and the weight coefficient calculator 206 combine (weighted-average) N of candidate prediction signals so as to produce the prediction signal of the target block (step S206, details are described later), and end the process (step S207).

Figure 11:
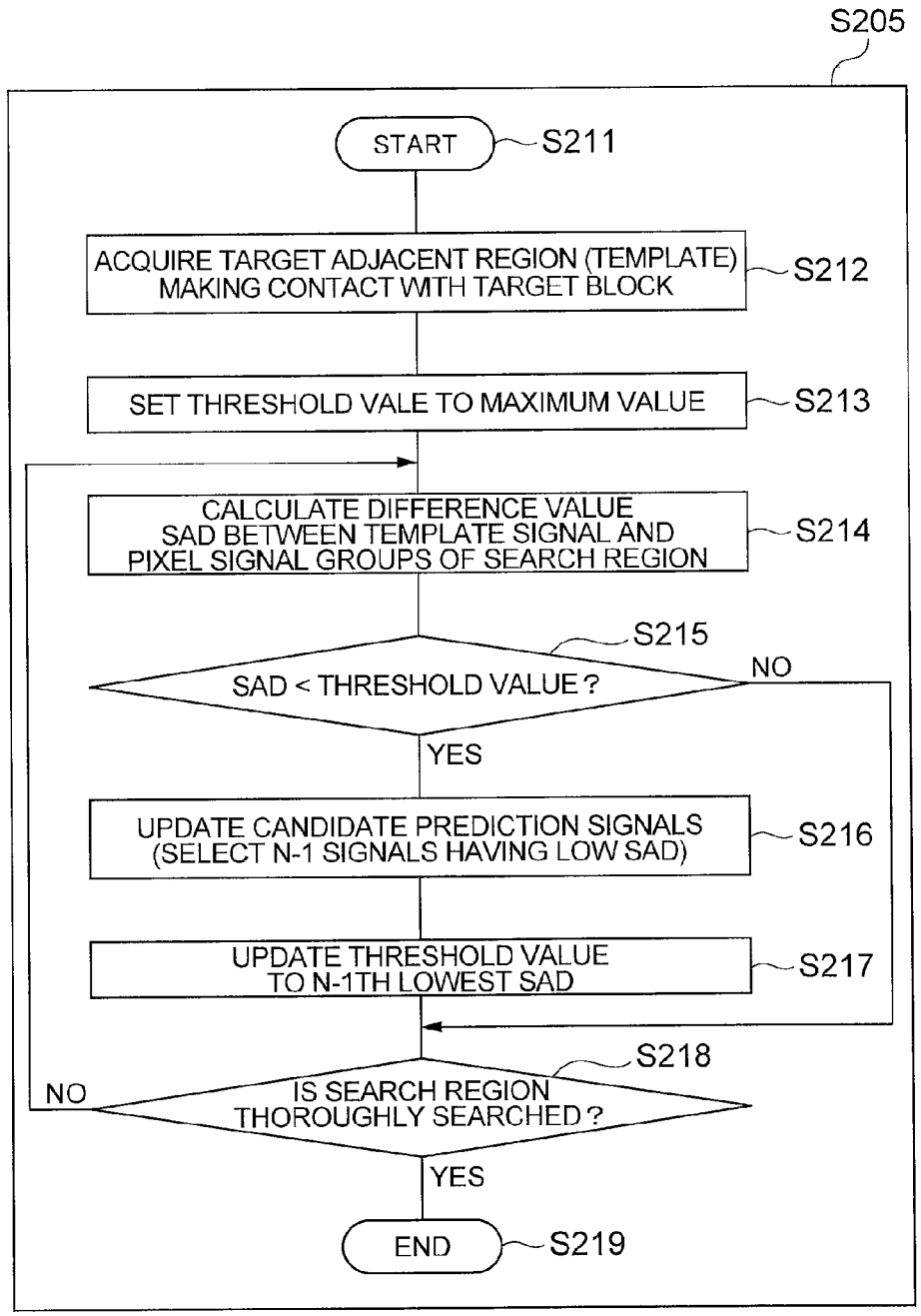
FIG. 11 is a flowchart to describe the procedure on the template matching process.

FIG. 11 is a flowchart showing a search method of N-1 type 2 candidate prediction signals in the template matcher 202 (details of step S205). The target adjacent region acquisition unit 211 derives, from the frame memory 104, the target adjacent region (template signal) having a reversed L-shape corresponding to the target block (step S212). Next, the candidate prediction region selector 213 sets a threshold value used in searching for N-1 candidate prediction regions to a maximum value (step S213). Next, the prediction adjacent region acquisition unit 212 sequentially derives, from the search region determined in step S204, the pixel group having the same shape as the target adjacent region. The candidate prediction region selector 213 calculates the difference value or SAD between the template signal and the pixel signal group derived from the search region (step S214). Further, the candidate prediction region selector 213 compares the calculated SAD and the above-described threshold value (step S215). If the calculated SAD is larger than the threshold value, the step proceeds to step S218 described later. If the calculated SAD is smaller than the threshold value, the type 2 candidate prediction regions are updated (step S216). In this step, maximum N-1 pixel signal groups with the lowest SAD are chosen from the pixel signal groups acquired from the search region as the candidate prediction regions. Then, the candidate prediction region selector 213 updates the threshold value to the [N-1]th lowest SAD value (step S217). The candidate prediction region selector 213 returns to step S214 if searching for all pixel signal groups in the search region is not completed while ends the process if completed (step S218 and step S219).

Figure 12:
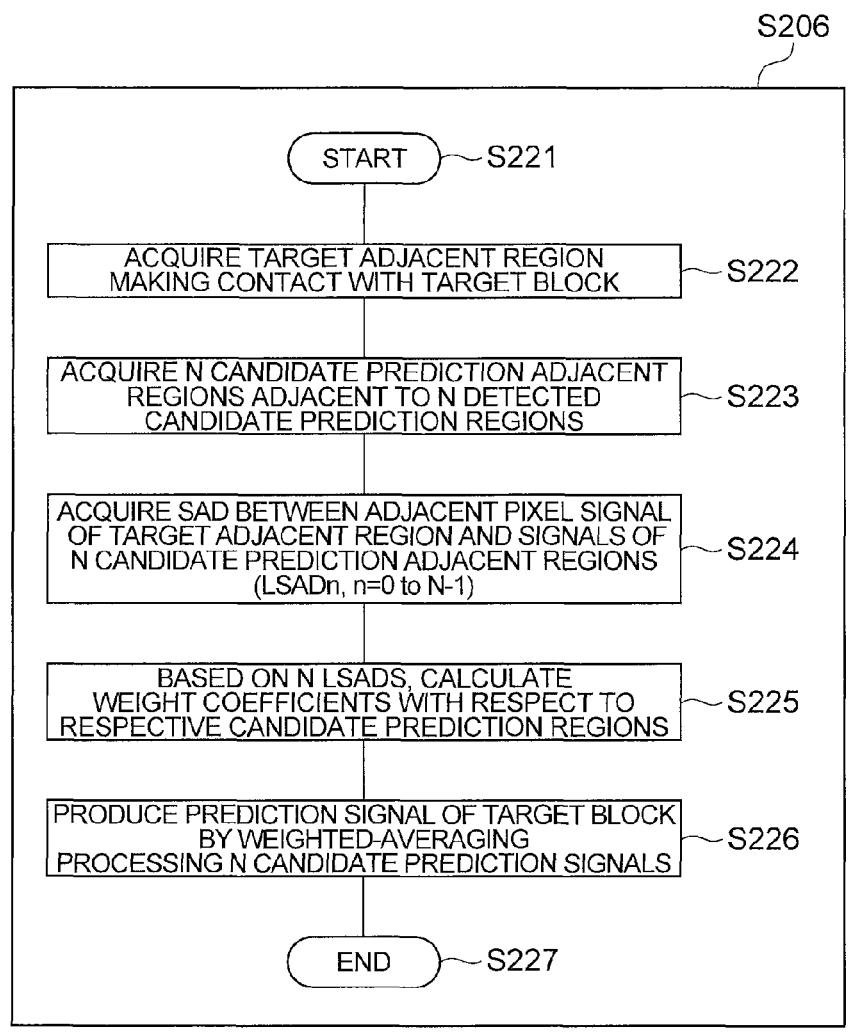
FIG. 12 is a flowchart to describe the procedure on a combining method of a plurality candidate prediction signals.

FIG. 12 is a flowchart to describe a method of combining N of candidate prediction signals in the candidate prediction signal combining unit 203 and the weight coefficient calculator 206 (details of step S206). The target adjacent region acquisition unit 221 derives the target adjacent region corresponding to the target block (step S222). The candidate prediction adjacent region acquisition unit 223 derives, from the frame memory 104, N candidate prediction adjacent regions adjacent to N candidate prediction regions obtained by the motion compensator 204 and the candidate prediction region acquisition unit 205 (step S223). Next, the weight coefficient determiner 224 calculates the SADs (LSADs) between the adjacent pixel signal of the target adjacent region and N candidate prediction adjacent signals of N candidate prediction adjacent regions by using formula (6) (step S224). Further, the weight coefficient determiner 224 calculates the weight coefficients corresponding to each candidate prediction region in accordance with formula (5) based on N LSADs (step S225). The weight coefficient multiplier 225 and the adder-divider 226 carry out weighted-averaging processing on N candidate prediction signals in accordance with formula (3) so as to produce the prediction signal of the target block (step S226), and end the process (step S227). Here, as shown in the description of FIG. 4, the method of combining N candidate prediction signals is not limited to the present embodiment shown herein.

The operation and effect of the image prediction encoding device 100 structured in this way are described. In the image prediction encoding device 100, the block division unit 102 divides an input image into a plurality of regions, and the motion estimator 113 searches for a signal having high correlation with a target pixel signal of a target region that is a processing target in the plurality of divided regions from already reproduced signals, and detects motion information for indicating the searched signal. The prediction signal generator 103 produces a prediction signal with respect to the target pixel signal of the target region. The subtractor 105 produces a residual signal indicating the difference between the produced prediction signal and the target pixel signal. The transformer 106, the quantizer 107, and the entropy encoder 111 encode the produced residual signal and the motion information detected by a motion estimation means.

Here, the motion compensator 204 of the prediction signal generator 103 produces a type 1 candidate prediction signal from an already reproduced signal based on the motion information. Additionally, the search region setter 201 of the prediction signal generator 103 determines a search region (the search region 414 in the reference picture 409) that is a partial region of the already reproduced signal, based on the motion information.

The template matcher 202 searches for, from the search region 414, one or more candidate prediction adjacent regions 412a to 412c having high correlation with the target adjacent region 415 composed of an already reproduced adjacent pixel signal adjacent to the target region 402, and produces one or more type 2 candidate prediction signals of the target pixel signal from the already reproduced signal based on a plurality of candidate adjacent regions.

The candidate prediction signal combining unit 203 produces a prediction signal by using at least either the type 1 candidate prediction signal produced by the motion estimator 113 or the type 2 candidate prediction signals produced by the template matcher 202.

This structure enables the search region to be identified, the search time for the type 2 candidate prediction signals to be reduced, and the prediction signal to be efficiently produced with less information and less computing amount.

Additionally, in the image prediction encoding device 100 of the present embodiment, the motion information detected by the motion estimator 113 includes at least information (reference picture number) indicating the picture 403 that is a first reproduction picture used for producing the type 1 candidate prediction signal, and information of a motion vector indicating the type 1 candidate prediction signal.

Then, the search region setter 201 determines the reference picture 409 that is a second reproduction picture including the search region 414 for the type 2 candidate prediction signals based on a picture distance in a temporal direction between the picture 401 including the target region and the reference picture 403 that is the first reproduction picture, and the motion vector.

This makes it possible to determine the search region for searching for the type 2 candidate prediction signals, and to promptly carry out the search process for the type 2 candidate prediction signals.

In the image prediction encoding device 100 of the present embodiment, the weight coefficient calculator 206 produces weight coefficients for weighted-averaging based on the difference values between the adjacent pixel signal of the target adjacent region and the pixel signals of the candidate prediction adjacent regions adjacent to a plurality of candidate prediction signals, and the candidate prediction signal combining unit 203 produces the prediction signal of the target region by weighted-averaging the plurality of candidate prediction signals by using the weight coefficients. This makes it possible to average the candidate prediction signal, enabling a more appropriate prediction signal to be produced.

In the image prediction encoding device 100 of the present embodiment, the template matcher 202 carries out a selection so that at least one of the components constituting the motion vector indicating the type 2 candidate prediction signals has a value other than zero when the value of each component constituting the motion vector is zero, and the search region 414 belongs to a different picture from the first reproduction picture. This makes it possible to achieve the averaging effect more effectively.

In the image prediction encoding device 100 of the present embodiment, the search region setter 201 determines the reference picture 409 that is the second reproduction picture as a picture in a temporally opposite direction to the reference picture 403 that is the first reproduction picture relative to the picture 401 including the target region 402. In other words, if the reference picture 403 that is the first reproduction picture is positioned in the past, the second reproduction picture 409 should be positioned in the future.

In the image prediction encoding device 100 of the present embodiment, the search region setter 201 determines the reference picture 409 that is the second reproduction picture as a picture that is different from the reference picture 403 that is the first reproduction picture, and is temporally closest to the picture 401 including the target region.

In the image prediction encoding device 100 of the present embodiment, the search region setter 201 selects a plurality of search regions 414 by selecting a plurality of pictures for the reference picture 409 that is the second reproduction picture.

In the image prediction encoding device 100 of the present embodiment, the search region setter 201 selects the reference picture 403 that is the first reproduction picture for the reference picture 409 that is the second reproduction picture.

In the image prediction encoding device 100 of the present embodiment, the search region setter 201 selects the reproduced region of the input image for the reference picture 409 that is the second reproduction picture.

In the image prediction encoding device 100 of the present embodiment, the search region setter 201 selects a different pixel signal from the type 1 candidate prediction signal for the type 2 candidate prediction signals.

As described above, determining and selecting the second reproduction picture or the type 2 candidate prediction signals can more appropriately average the candidate prediction signals, enabling an appropriate prediction signal to be produced.

<Image Prediction Decoding Method>

Figure 13:
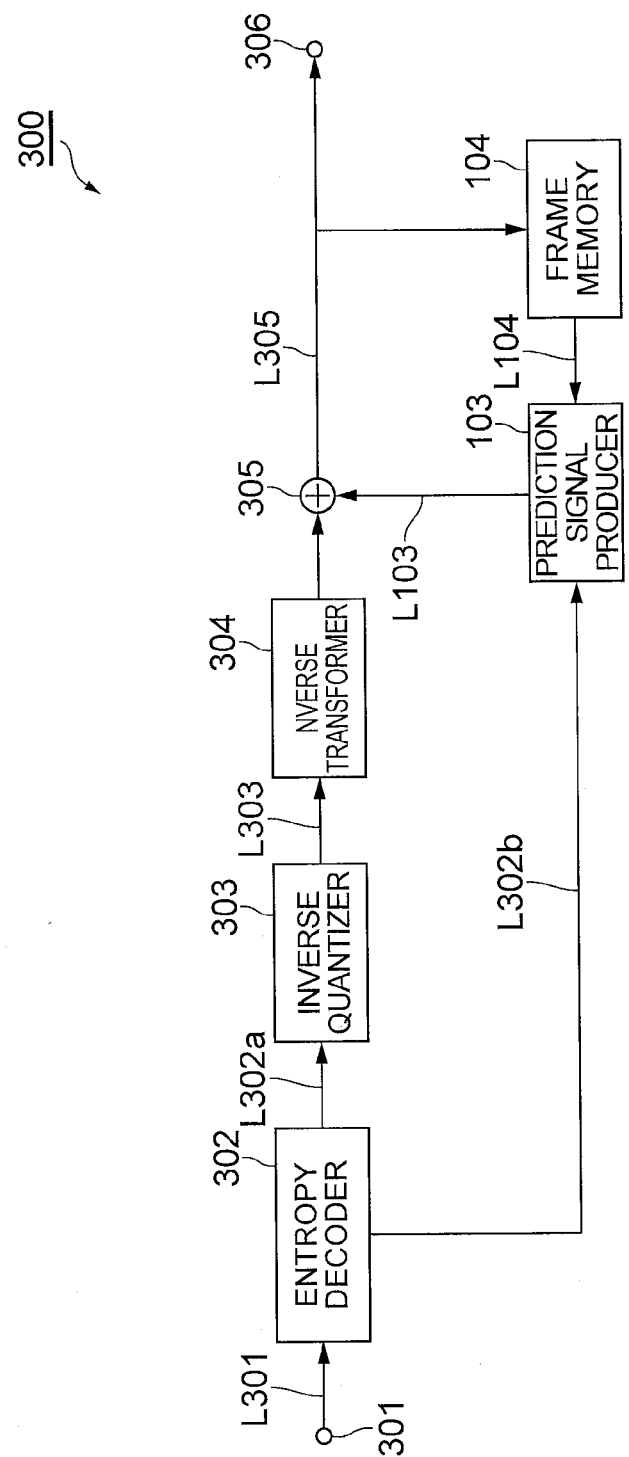
FIG. 13 is a block diagram showing an image prediction decoding device according to another embodiment.

Next, an image prediction decoding method according to another embodiment is described. FIG. 13 is a block diagram showing an image prediction decoding device 300 according to the present embodiment. The image prediction decoding device 300 is provided with an input terminal 301, an entropy decoder 302 (data decoding means), an inverse quantizer 303 (data decoding means), an inverse transformer 304 (residual signal restoring means), an adder 305 (image restoring means), an output terminal 306, the frame memory 104, and the prediction signal generator 103 (prediction signal production means). Besides the inverse quantizer 303 and the inverse transformer 304, any unit can be used as the data decoding means. The inverse transformer 304 is not necessarily required.

The input terminal 301 receives compressed data that is compression-encoded by the image prediction encoding method described above. The compressed data includes residual signal information and motion prediction information obtained by predicting and encoding a target block that is one of a plurality of blocks divided from an image. Here, the motion prediction information, motion information, can include various kinds of setting information, such as the size of a search range of the type 2 candidate prediction signals and the value of N (the number of candidate prediction signals), in addition to the motion vector and the reference picture number in the inter-picture/the intra-picture prediction method.

The entropy decoder 302 entropy-decodes the compressed data input to the input terminal 301 so as to reproduce the residual signal information and the motion prediction information of the target block.

The inverse quantizer 303 inputs the residual signal information of the target block through a line L302a, and inverse-quantizes the information. The inverse transformer 304 performs an inverse discrete cosine transform process on the inverse-quantized data.

The prediction signal generator 103 receives the motion information from the entropy decoder 302 through a line L302b. The prediction signal generator 103 derives a reference picture from the frame memory 104 based on the input motion information to produce a prediction signal.

The prediction signal generator 103 outputs the produced prediction signal to the adder 305 through the line L103.

The adder 305 adds the prediction signal produced by the prediction signal generator 103 to the residual signal restored by the inverse quantizer 303 and the inverse transformer 304, and outputs the reproduction image signal of the target block to the output terminal 306 and the frame memory 104 through a line L305. The output terminal 306 outputs the signal to an outside (for example, a display).

The frame memory 104 stores the reproduction image output from the adder 305 as a reference reproduction image for a subsequent decoding process.

Since the operations of the frame memory 104 and the prediction signal generator 103 are the same as those in the image prediction encoding device 100 of FIG. 1, the description thereof is omitted. The prediction signal generator 103 produces a plurality of candidate prediction signals based on the decoded motion information, and combines them to produce a prediction signal according to a target block to be reproduecd. The motion information input to the prediction signal generator 103 through L302b and the motion information input to the prediction signal generator 103 through L113 are the same.

Figure 14:
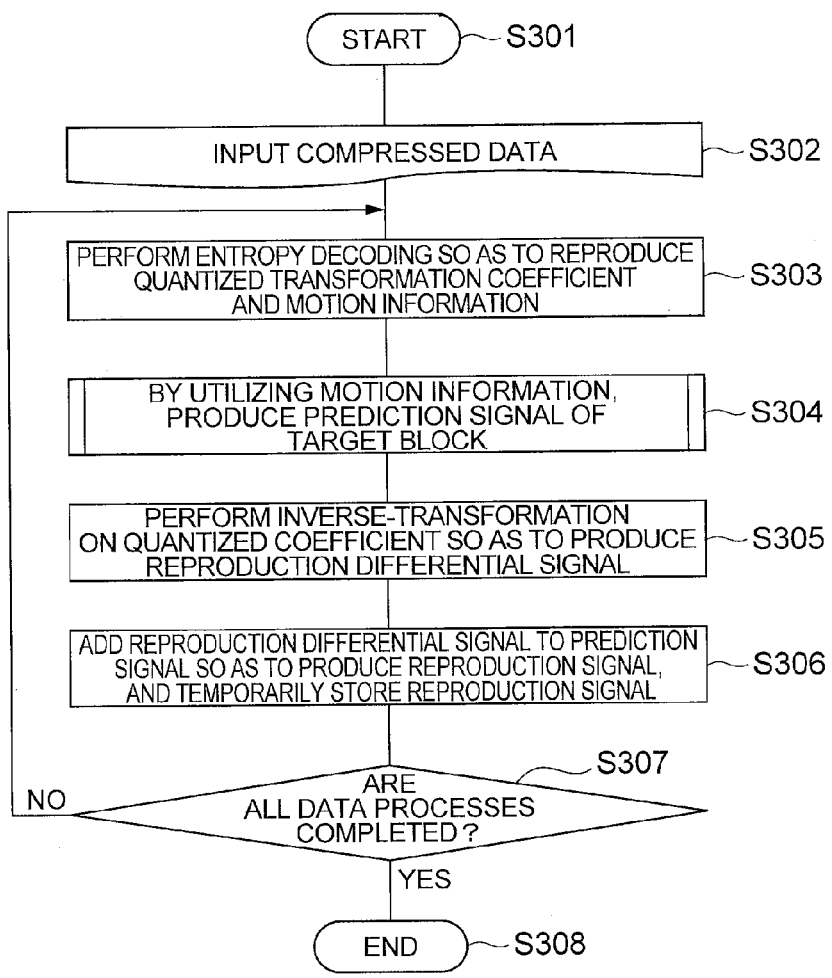
FIG. 14 is a flowchart showing the procedure on an image prediction decoding method of the image prediction decoding device shown in FIG. 13.

Next, an image prediction decoding method in the image prediction decoding device 300 shown in FIG. 13 is described by using FIG. 14. First, compressed data is input through the input terminal 301 (step S302). Then, the entropy decoder 302 performs entropy decoding on the compressed data so as to reproduce a quantized transform coefficient and motion information (step S303). The prediction signal generator 103 produces a plurality of candidate prediction signals based on the detected motion information, and combines the plurality of produced candidate prediction signals so as to produce a prediction signal (step S304).

Meanwhile, the quantized transform coefficient is inverse-quantized by the inverse quantizer 303 with a quantized parameter, and then the inverse transformer 304 performs an inverse transformation process so as to produce a reproduced differential signal (step S305). Then, the produced prediction signal and the reproduced differential signal are added so as to produce a reproduction signal. The reproduction signal is stored in the frame memory 104 so as to reproduce a subsequent target block (step S306). If there is subsequent compressed data, this process is repeated (step S307), so that all pieces of data are thoroughly processed (step S308). The process returns to step S302 if needed so as to take in compressed data.

Since the process flow of step S304 is the same as that in FIG. 10 to FIG. 12, the description thereof is omitted.

Next, the operation and effect of the image prediction decoding method of the present embodiment are described. In the image prediction decoding device 300 of the present invention, the entropy decoder 302 and the inverse quantizer 303 decode, from compressed data, encoded data of motion information and encoded data of a residual signal relating to a target region that is the target for processing. The inverse transformer 304 restores a reproduction residual signal from the residual signal obtained by decoding.

The prediction signal generator 103 produces a prediction signal corresponding to a target pixel signal of the target region. The adder 305 adds the produced prediction signal to the restored reproduction residual signal so as to restore the pixel signal of the target region, and outputs the signal to the frame memory 104 to store the signal.

The prediction signal generator 103 produces a type 1 candidate prediction signal from an already reproduced signal stored in the frame memory 104 based on the decoded motion information. In addition, based on the motion information, the search region 414 that is a partial region of the already reproduced signal is determined.

The template matcher 202 searches for, from the search region 414, one or more prediction adjacent regions 412a to 412c having high correlation with the target adjacent region 415 composed of an already reproduced adjacent pixel signal adjacent to the target region, and produces one or more type 2 candidate prediction signals of the target pixel signal from the already reproduced signal based on the plurality of the prediction adjacent regions.

The candidate prediction signal combining unit 203 produces a prediction signal based on at least either the produced type 1 candidate prediction signal or the produced type 2 candidate prediction signals.

Additionally, in the image prediction decoding device 300 of the present embodiment, the motion information obtained by decoding includes at least information (reference picture number) indicating the reference picture 403 that is a first reproduction picture used for producing the type 1 candidate prediction signal, and information of a motion vector indicating the type 1 candidate prediction signal.

Then, the search region setter 201 determines the reference picture 409 that is a second reproduction picture including the search region 414 for the type 2 candidate prediction signals based on a picture distance in a temporal direction between the picture 401 including the target region and the reference picture 403 that is the first reproduction picture, and the motion vector.

This makes it possible to determine the search region for searching for the type 2 candidate prediction signals, and to promptly conduct the search process for the type 2 candidate prediction signals.

In the image prediction decoding device 300 of the present embodiment, the candidate prediction signal combining unit 203 produces weight coefficients for weighted-averaging based on the difference values between the adjacent pixel signal of the target adjacent region and the pixel signals of the candidate prediction adjacent regions adjacent to a plurality of candidate prediction signals, and produces the prediction signal of the target region by weighted-averaging the plurality of candidate prediction signals with the weight coefficients. This makes it possible to average the candidate prediction signal, enabling a more appropriate prediction signal to be produced.

In the image prediction decoding device 300 of the present embodiment, the template matcher 202 carries out a selection so that at least one of components constituting the motion vector indicating the type 2 candidate prediction signals has a value other than zero, when the value of each component constituting the motion vector is zero and the search region 414 is located in a different picture from the first reproduction picture. This makes it possible to achieve the averaging effect more effectively.

In the image prediction decoding device 300 of the present embodiment, the search region setter 201 determines the reference picture 409 that is the second reproduction picture as a picture in a temporally opposite direction to the reference picture 403 that is the first reproduction picture relative to the picture 401 including the target region 402. In other words, if the reference picture 403 that is the first reproduction picture is in a past position, and if there is a picture that positions the reference picture 409 that is the second reproduction picture in the future, the search region setter 201 preferentially selects the picture as the reference picture 409 that is the second reproduction picture.

In the image prediction decoding device 300 of the present embodiment, the search region setter 201 determines the reference picture 409 that is the second reproduction picture as a picture that is different from the reference picture 403 that is the first reproduction picture, and is temporally closest to the picture 401 including the target region.

In the image prediction decoding device 300 of the present embodiment, the search region setter 201 selects a plurality of search regions 414 by selecting a plurality of pictures for the reference picture 409 that is the second reproduction picture.

In the image prediction decoding device 300 of the present embodiment, the search region setter 201 selects the reference picture 403 that is the first reproduction picture for the reference picture 409 that is the second reproduction picture.

In the image prediction decoding device 300 of the present embodiment, the search region setter 201 selects the reproduced region of the input image for the reference picture 409 that is the second reproduction picture.

In the image prediction decoding device 300 of the present embodiment, the search region setter 201 selects a different pixel signal from the type 1 candidate prediction signal for the type 2 candidate prediction signals.

As described above, determining and selecting the second reproduction picture or the type 2 candidate prediction signals can more appropriately average the candidate prediction signals, enabling an appropriate prediction signal to be produced.

<Programs in the Image Prediction Encoding Method and the Image Prediction Decoding Method>

The image prediction encoding method and the image prediction decoding method according to another embodiment can be provided as a program stored in a record medium. Examples of the record medium include record media including floppy disks (registered trademark), CD-ROMs, DVDs, and ROMs, and semiconductor memories.

Figure 15:
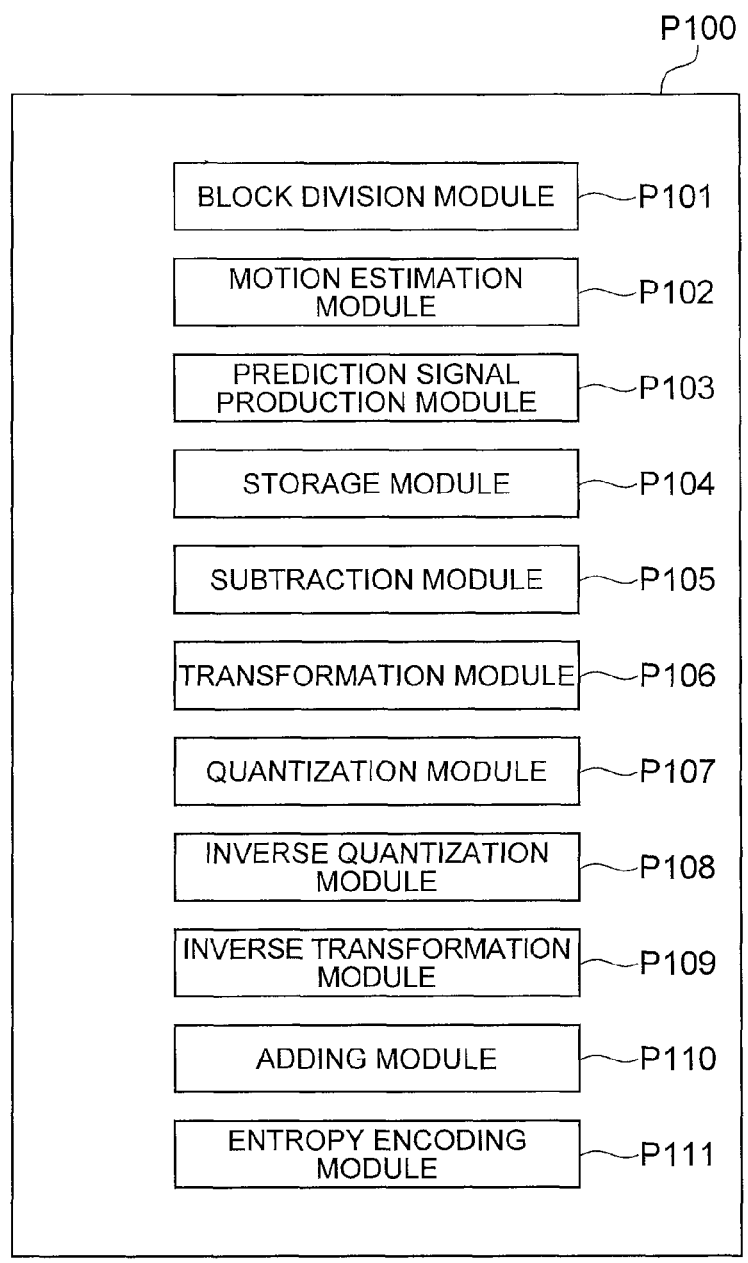
FIG. 15 is a block diagram showing a program capable of executing the image prediction encoding method according to another embodiment.
Figure 16:
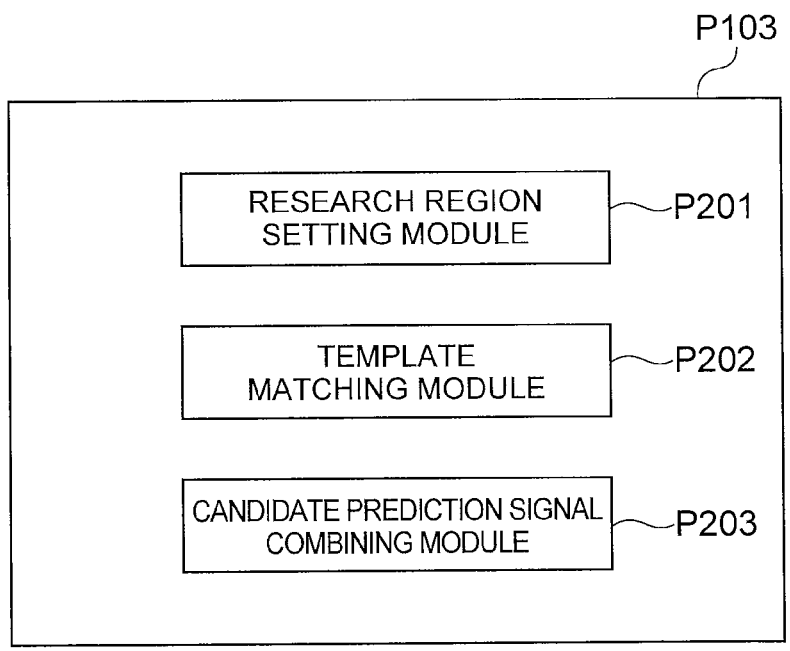
FIG. 16 is a block diagram showing a prediction signal production module shown in FIG. 15.

FIG. 15 is a block diagram showing the modules of a program capable of executing the image prediction encoding method. An image prediction encoding program P100 is provided with a block division module P101, a motion estimation module P102, a prediction signal production module P103, a storage module P104, a subtraction module P105, a transformation module P106, a quantization module P107, an inverse quantization module P108, an inverse transformation module P109, an adding module P110, and an entropy encoding module P111. The prediction signal production module P103 is provided with a search region setting module P201, a template matching module P202, and a candidate prediction signal combining module P203, as shown in FIG. 16.

The functions realized by executing each module described above are the same as those of the image prediction encoding device 100 described above. That is, the functions of modules of the image prediction encoding program P100 are the same as those of the motion estimator 113, the block division unit 102, the prediction signal generator 103, the frame memory 104, the subtractor 105, the transformer 106, the quantizer 107, the inverse quantizer 108, the inverse transformer 109, the adder 110, the entropy encoder 111, the search region setter 201, the template matcher 202, and the candidate prediction signal combining unit 203.

Figure 17:
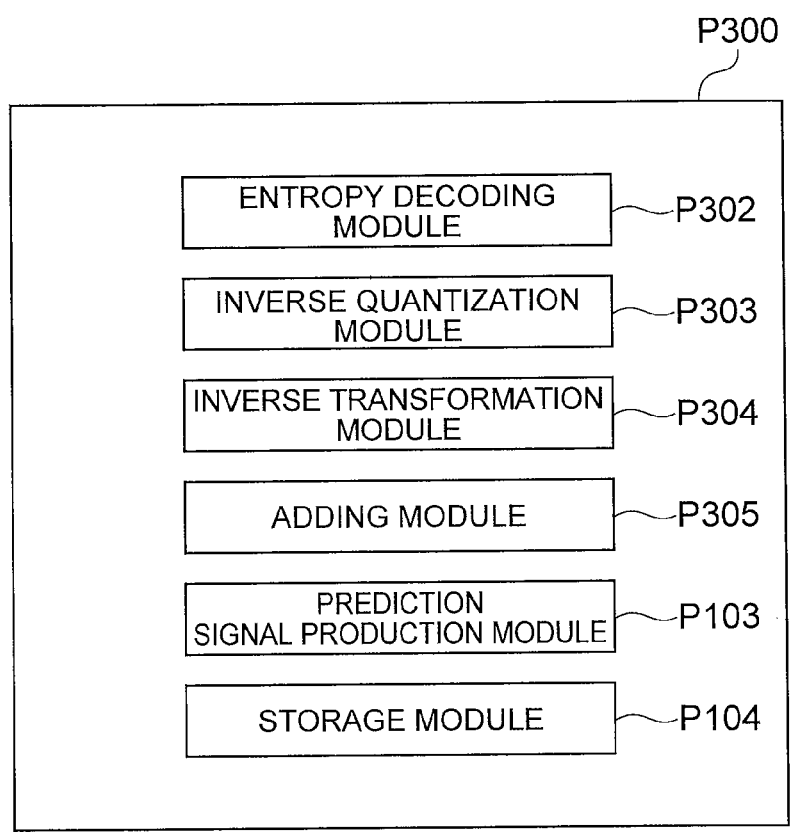
FIG. 17 is a block diagram showing a program capable of executing the image prediction decoding method according to another embodiment.

FIG. 17 is a block diagram showing the modules of a program capable of executing the image prediction decoding method. An image prediction decoding program P300 is provided with an entropy decoding module P302, an inverse quantization module P303, an inverse transformation module P304, an adding module P305, the storage module P104 and the prediction signal production module P103.

The functions realized by executing each module described above are the same as those of the components included in the image prediction decoding device 300 described above. That is, the functions of the modules of the image prediction decoding program P300 are the same as those of the entropy decoder 302, the inverse quantizer 303, the inverse transformer 304, the adder 305, the frame memory 104, and the prediction signal generator 103.

The image prediction encoding program P100 and the image prediction decoding program P300 both of which are structured in this way are stored in a record medium 10 and executed by a computer described later.

Figure 18:
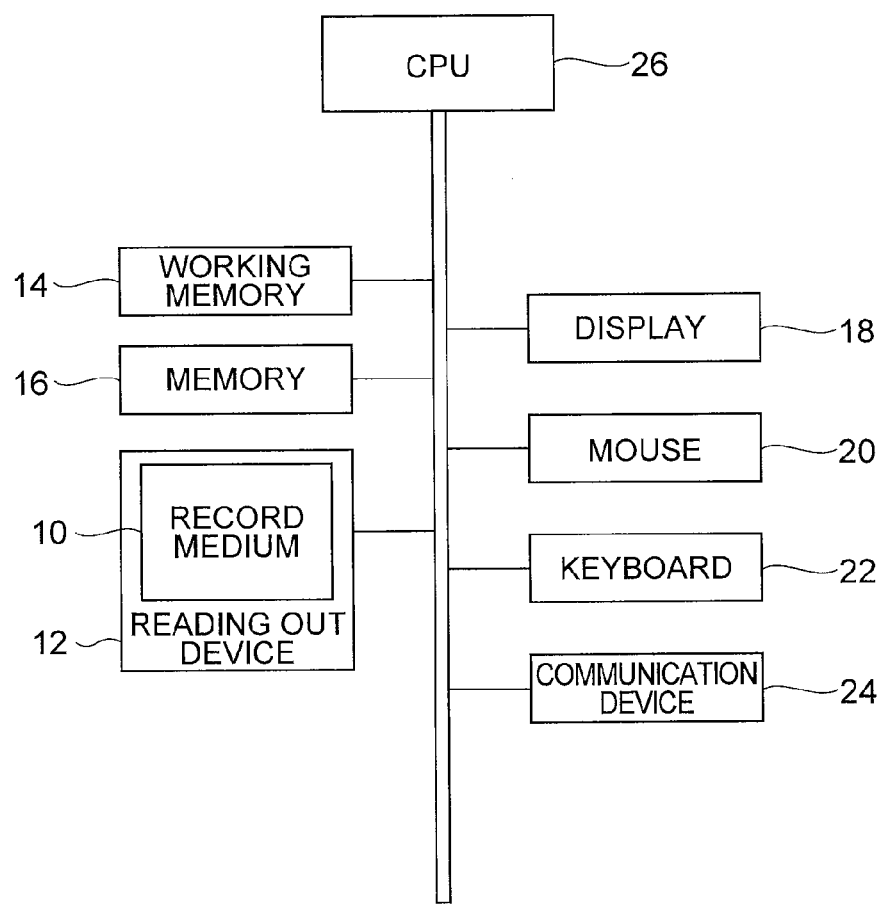
FIG. 18 shows a hardware structure of a computer for executing a program stored in a record medium.
Figure 19:
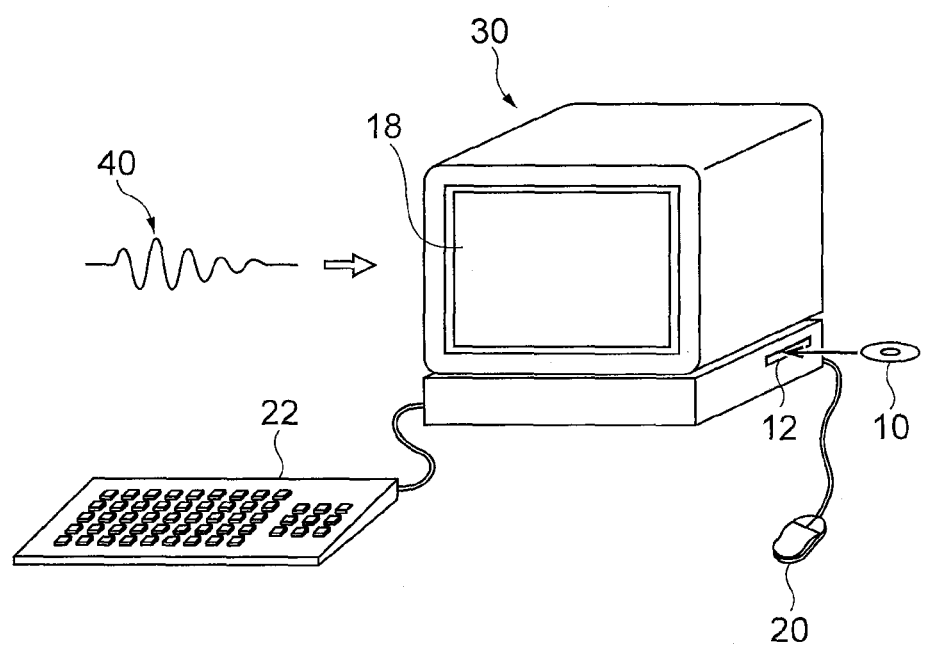
FIG. 19 is a perspective view of the computer for executing the program stored in the record medium.

FIG. 18 shows a hardware structure of a computer for executing the program stored in the record medium. FIG. 19 is a perspective view of a computer for executing the program stored in the record medium. In this regard, one that executes a program stored in a record medium is not limited to the computer. DVD players, set top boxes, cell-phones, and the like that include a CPU and software for processing and controlling may be used.

As shown in FIG. 18, a computer 30 is provided with a reading out device 12 such as a floppy disk drive (floppy disk is the registered trademark), a CD-ROM drive device, and a DVD drive device, a working memory (RAM) 14 including a resident operating system, a memory 16 that stores a program stored in the record medium 10, a display device 18 such as a display, a mouse 20 and a keyboard 22 both of which are input devices, a communication device 24 that transmits and receives data and the like, and a CPU 26 that controls the execution of the program. Upon insertion of the record medium 10 into the reading out device 12, the computer 30 becomes accessible to the image prediction encoding and decoding programs stored in the record medium from the reading out device 12. The image encoding and decoding programs enable the computer 30 to operate as the image encoding device or the image decoding device according to the present embodiment.

As shown in FIG. 19, the image prediction encoding program and the image decoding program may be provided through a network as a computer data signal 40 superimposed on a carrier wave. In this case, the computer 30 stores to the memory 16 the image prediction encoding program or the image decoding program that are received by the communication device 24, and can execute the image prediction encoding program or the image decoding program.

As described above, the present invention has been described in detail based on the embodiments. The present invention, however, is not limited to the above-described embodiments and various modifications can be made without departing from the scope of the invention.

The invention claimed is:

1. An image prediction encoding device comprising:
   a region division means for dividing an input image into a plurality of regions;
   a motion estimation means for searching for, from an already reproduced signal of a first reproduction picture, a signal having high correlation with a target pixel signal of a target region to be processed in the plurality of regions divided by the region division means, and detects motion information for indicating the searched signal;
   a prediction signal production means for producing a prediction signal with respect to the target pixel signal of the target region;
   a residual signal production means for producing a residual signal indicating a difference between the prediction signal produced by the prediction signal production means and the target pixel signal; and
   an encoding means for encoding the residual signal produced by the residual signal production means and the motion information detected by the motion estimation means, wherein
   the prediction signal production means includes:
   a motion compensation means for producing a type 1 candidate prediction signal from the already reproduced signal of the first reproduction picture based on the motion information;
   a search region determination means for determining a search region that is a partial region of an already reproduced signal of a second reproduction picture based on the motion information, the second reproduction picture being different than the first reproduction picture;
   a template matching means for searching for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal of the second reproduction picture based on the one or more prediction adjacent regions; and
   a candidate prediction signal combining means for producing the prediction signal by using the type 1 candidate prediction signal produced by the motion compensation means and the one or more type 2 candidate prediction signals produced by the template matching means.

2. The image prediction encoding device according to claim 1, wherein the motion information detected by the motion estimation means includes at least information indicating the first reproduction picture used for producing the type 1 candidate prediction signal and information of a motion vector indicating the type 1 candidate prediction signal,
   the search region determination means selects the second reproduction picture including the search region based on the information of the first reproduction picture, and determines a spatial location of the search region in the second reproduction picture by using a picture distance in a temporal direction between a picture including the target region and the first reproduction picture, a picture distance in a temporal direction between a picture including the target region and the second reproduction picture, and the motion vector.

3. The image prediction encoding device according to claim 1, wherein the candidate prediction signal combining means produces weight coefficients for weighted-averaging based on difference values between the adjacent pixel signal of the target adjacent region and pixel signals of candidate prediction adjacent regions adjacent to the plurality of candidate prediction signals, and produces the prediction signal of the target region by weighted-averaging the plurality of candidate prediction signals with the weight coefficients.

4. The image prediction encoding device according to claim 1, wherein the template matching means carries out a selection so that at least any of components constituting the motion vector indicating the type 2 candidate prediction signals has a value other than zero when a value of each component constituting the motion vector is zero and the search region belongs to a different picture from the first reproduction picture.

5. The image prediction encoding device according to claim 1, wherein the search region determination means determines the second reproduction picture as a picture located in a temporally opposite direction to the first reproduction picture relative to the picture including the target region.

6. The image prediction encoding device according to claim 1, wherein the search region determination means determines the second reproduction picture as a picture that is different from the first reproduction picture and is temporally closest to the picture including the target region.

7. The image prediction encoding device according to claim 1, wherein the search region determination means selects a plurality of search regions by selecting a plurality of pictures for the second reproduction picture.

8. The image prediction encoding device according to claim 1, wherein the search region determination means selects a reproduced region of the input image for the second reproduction picture.

9. The image prediction encoding device according to claim 1, wherein the search region determination means selects different pixel signals from the type 1 candidate prediction signal for the type 2 candidate prediction signals.

10. An image prediction decoding device comprising:
  a data decoding means for decoding, from compressed data, encoded data of motion information and encoded data of a residual signal relating to a target region to be processed;
  a residual signal restoring means for restoring a reproduction residual signal from the residual signal decoded by the data decoding means;
  a prediction signal production means for producing a prediction signal with respect to a target pixel signal of the target region; and
  an image restoring means for restoring a pixel signal of the target region by adding the prediction signal produced by the prediction signal production means to the reproduction residual signal restored by the residual signal restoring means, wherein
  the prediction signal production means includes:
    a motion compensation means for producing a type 1 candidate prediction signal from an already reproduced signal of a first reproduction picture based on the motion information decoded by the data decoding means;
    a search region determination means for determining a search region that is a partial region of an already reproduced signal of a second reproduction picture based on the motion information, the second reproduction picture being different from the first reproduction picture;
    a template matching means for searching for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal of the second reproduction picture based on the one or more prediction adjacent regions; and
    a candidate prediction signal combining means for producing the prediction signal based on the type 1 candidate prediction signal produced by the motion compensation means and the one or more type 2 candidate prediction signals produced by the template matching means.

11. The image prediction decoding device according to claim 10, wherein the motion information detected by the motion estimation means includes at least information indicating the first reproduction picture used for producing the type 1 candidate prediction signal and information of a motion vector indicating the type 1 candidate prediction signal;
  the search region determination means selects the second reproduction picture including the search region based on the first reproduction picture, and determines a spatial location of the search region in the second reproduction picture by using a picture distance in a temporal direction between a picture including the target region and the first reproduction picture, a picture distance in a temporal direction between a picture including the target region and the second reproduction picture, and the motion vector.

12. The image prediction decoding device according to claim 10, wherein the candidate prediction signal combining means produces weight coefficients for weighted-averaging based on difference values between the adjacent pixel signal of the target adjacent region and pixel signals of candidate prediction adjacent regions adjacent to the plurality of candidate prediction signals, and produces the prediction signal of the target region by weighted-averaging the plurality of candidate prediction signals based on the weight coefficients.

13. The image prediction decoding device according to claim 10, wherein the template matching means carries out a selection so that at least any of components constituting the motion vector indicating the type 2 candidate prediction signals has a value other than zero when a value of each component constituting the motion vector is zero and the search region belongs to a different picture from the first reproduction picture.

14. The image prediction decoding device according to claim 10, wherein the search region determination means determines the second reproduction picture as a picture located in a temporally opposite direction to the first reproduction picture relative to the picture including the target region.

15. The image prediction decoding device according to claim 10, wherein the search region determination means determines the second reproduction picture as a picture that is different from the first reproduction picture and is temporally closest to the picture including the target region.

16. The image prediction decoding device according to claim 10, wherein the search region determination means selects a plurality of search regions by selecting a plurality of pictures for the second reproduction picture.

17. The image prediction decoding device according to claim 11, wherein the search region determination means selects the picture including the target region for the second reproduction picture.

18. The image prediction decoding device according to claim 10, wherein the search region determination means selects different pixel signals from the type 1 candidate prediction signal for the type 2 candidate prediction signals.

19. An image prediction encoding method comprising:
a region division step executed by a processor to divide an input image into a plurality of regions;
a motion estimation step executed by the processor to search for, from an already reproduced signal of a first reproduction picture, a signal having high correlation with a target pixel signal of a target region to be processed in the plurality of regions divided in the region division step, and detects motion information for indicating the searched signal;
a prediction signal production step executed by the processor to produce a prediction signal with respect to the target pixel signal of the target region;
a residual signal production step executed by the processor to produce a residual signal indicating a difference between the prediction signal produced in the prediction signal production step and the target pixel signal; and
an encoding step executed by the processor to encode the residual signal produced in the residual signal production step and the motion information detected in the motion estimation step, wherein
the prediction signal production step includes:
a motion compensation step executed by the processor to produce a type 1 candidate prediction signal from the already reproduced signal of the first reproduction picture based on the motion information;
a search region determination step executed by the processor to determine a search region that is a partial region of an already reproduced signal of a second reproduction picture based on the motion information, the second reproduction picture being different than the first reproduction picture;
a template matching step executed by the processor to search for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal of the second reproduction picture based on the one or more prediction adjacent regions; and
a candidate prediction signal combining step executed by the processor to produce the prediction signal based on the type 1 candidate prediction signal produced in the motion compensation step and the one or more type 2 candidate prediction signals produced in the template matching step.

20. An image prediction decoding method comprising:
a data decoding step executed by a processor to decode, from compressed data, encoded data of motion information and encoded data of a residual signal relating to a target region to be processed;
a residual signal restoring step executed by the processor to restore a reproduction residual signal from the residual signal decoded in the data decoding step;
a prediction signal production step executed by the processor to produce a prediction signal with respect to a target pixel signal of the target region; and
an image restoring step executed by the processor to restore a pixel signal of the target region by adding the prediction signal produced in the prediction signal production step to the reproduction residual signal restored in the residual signal restoring step, wherein
the prediction signal production step includes:
a motion compensation step executed by the processor to produce a type 1 candidate prediction signal from an already reproduced signal of a first reproduction picture based on the motion information decoded in the data decoding step;
a search region determination step executed by the processor to determine a search region that is a partial region of an already reproduced signal of a second reproduction picture based on the motion information, the second reproduction picture being different than the first reproduction picture;
a template matching step executed by the processor to search for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal of the second reproduction picture based on the one or more prediction adjacent regions; and
a candidate prediction signal combining step executed by the processor to produce the prediction signal based on the type 1 candidate prediction signal produced in the motion compensation step and the one or more type 2 candidate prediction signals produced in the template matching step.

21. A non-transitory tangible medium comprising modules executable by a processor as an image prediction encoding program, the computer readable storage medium comprising:
a region division module that is executable by the processor to divide an input image into a plurality of regions;
a motion estimation module that is executable by the processor to search for, from an already reproduced signal of a first reproduction picture, a signal having high correlation with a target pixel signal of a target region to be processed in the plurality of regions divided by the region division module, and detects motion information for indicating the searched signal;
a prediction signal production module that is executable by the processor to produce a prediction signal with respect to the target pixel signal of the target region;
a residual signal production module that is executable by the processor to produce a residual signal indicating a difference between the prediction signal produced by the prediction signal production module and the target pixel signal; and
an encoding module that is executable by the processor to encode the residual signal produced by the residual signal production module and the motion information detected by the motion estimation module, wherein
the prediction signal production module includes:
a motion compensation module executable by the processor to produce a type 1 candidate prediction signal from the already reproduced signal of the first reproduction picture based on the motion information;
a search region determination module executable by the processor to determine a search region that is a partial region of an already reproduced signal of a second reproduction picture based on the motion information, the second reproduction picture being different than the first reproduction picture;

a template matching module executable by the processor to search for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal of the second reproduction picture based on the one or more prediction adjacent regions; and a candidate prediction signal combining module executable by the processor to produce the prediction signal based on the type 1 candidate prediction signal produced by the motion compensation module and the one or more type 2 candidate prediction signals produced by the template matching module.

22. A non-transitory tangible medium comprising modules executable by a processor as an image prediction decoding program, the computer readable storage medium comprising:

a data decoding module executable by the processor to decode, from compressed data, encoded data of motion information and encoded data of a residual signal relating to a target region to be processed;

a residual signal restoring module executable by the processor to restore a reproduction residual signal from the residual signal decoded by the data decoding module;

a prediction signal production module executable by the processor to produce a prediction signal with respect to a target pixel signal of the target region; and an image restoring module executable by the processor to restore a pixel signal of the target region by adding the prediction signal produced by the prediction signal production module to the reproduction residual signal restored by the residual signal restoring module, wherein the prediction signal production module includes:

a motion compensation module executable by the processor to produce a type 1 candidate prediction signal from an already reproduced signal of a first reproduction picture based on the motion information decoded by the data decoding module;

a search region determination module executable by the processor to determine a search region that is a partial region of an already reproduced signal of a second reproduction picture based on the motion information, the second reproduction picture being different from the first reproduction picture;

a template matching module executable by the processor to search for, from the search region, one or more prediction adjacent regions having high correlation with a target adjacent region composed of an already reproduced adjacent pixel signal adjacent to the target region, and produces one or more type 2 candidate prediction signals of the target pixel signal from the already reproduced signal of the second reproduction picture based on the one or more prediction adjacent regions; and a candidate prediction signal combining module executable by the processor to produce the prediction signal based on the type 1 candidate prediction signal produced by the motion compensation module and the one or more type 2 candidate prediction signals produced by the template matching module.

* * * * *

UNITED STATES PATENT AND TRADEMARK OFFICE
CERTIFICATE OF CORRECTION

PATENT NO. : 8,705,611 B2
APPLICATION NO. : 12/989046
DATED : April 22, 2014
INVENTOR(S) : Suzuki et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 626 days.

Signed and Sealed this
Twenty-ninth Day of September, 2015

Michelle K. Lee
*Director of the United States Patent and Trademark Office*